(12) United States Patent
Imoto et al.

(10) Patent No.: US 9,798,456 B2
(45) Date of Patent: Oct. 24, 2017

(54) INFORMATION INPUT DEVICE AND INFORMATION DISPLAY METHOD

(71) Applicant: Panasonic Intellectual Property Corporation of America, Torrance, CA (US)

(72) Inventors: Hiroyasu Imoto, Osaka (JP); Tomonari Takahashi, Osaka (JP); Masaki Yamauchi, Osaka (JP); Yoshihiro Kojima, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 493 days.

(21) Appl. No.: 14/353,876

(22) PCT Filed: Aug. 7, 2013

(86) PCT No.: PCT/JP2013/004766
§ 371 (c)(1),
(2) Date: Apr. 24, 2014

(87) PCT Pub. No.: WO2014/034031
PCT Pub. Date: Mar. 6, 2014

(65) Prior Publication Data
US 2014/0298261 A1 Oct. 2, 2014

(30) Foreign Application Priority Data
Aug. 30, 2012 (JP) .................................. 2012-190622

(51) Int. Cl.
*G06F 3/048* (2013.01)
*G06F 3/0484* (2013.01)
(Continued)

(52) U.S. Cl.
CPC .......... *G06F 3/04845* (2013.01); *G06F 3/017* (2013.01); *G06F 3/0346* (2013.01);
(Continued)

(58) Field of Classification Search
None
See application file for complete search history.

(56) References Cited

U.S. PATENT DOCUMENTS 8,525,805 B2   9/2013  Digon
2002/0191029 A1* 12/2002  Gillespie ............. G06F 3/04817
                                                              715/810
(Continued)

FOREIGN PATENT DOCUMENTS

EP      2 169 926      3/2010
EP      2 189 891      5/2010
(Continued)

OTHER PUBLICATIONS

International Search Report dated Nov. 12, 2013 in corresponding International Application No. PCT/JP2013/004766.
(Continued)

*Primary Examiner* — Hua Lu
(74) *Attorney, Agent, or Firm* — Wenderoth, Lind & Ponack, L.L.P.

(57) ABSTRACT

An information input device including: an indicator detection unit; a pointer position setting unit which sets a position of a pointer to be displayed on a display screen; a storage unit which obtains and stores time-sequenced positional information which indicates the set position; a first passage detection unit which detects that the pointer has passed through a first specific region which is a predetermined region on the display screen, using the time-sequenced positional information; and a direction obtainment unit which obtains a direction in which the pointer has passed
(Continued)

through the first specific region if it is detected that the pointer has passed through the first specific region; and a first image modifying unit which modifies a displayed image, depending on the obtained direction.

30 Claims, 31 Drawing Sheets

(51) Int. Cl.
    *G06F 3/0346*     (2013.01)
    *G06F 3/0481*     (2013.01)
    *G06F 3/0482*     (2013.01)
    *G06F 3/0485*     (2013.01)
    *G06F 3/01*     (2006.01)

(52) U.S. Cl.
    CPC .......... *G06F 3/0482* (2013.01); *G06F 3/0484* (2013.01); *G06F 3/0485* (2013.01); *G06F 3/04817* (2013.01); *G06F 3/04842* (2013.01)

(56) References Cited

U.S. PATENT DOCUMENTS

| | | | | |
|---|---|---|---|---|
| 2006/0026535 | A1* | 2/2006 | Hotelling | G06F 3/0418 715/863 |
| 2006/0256109 | A1* | 11/2006 | Acker | G06T 15/20 345/419 |
| 2010/0125786 | A1* | 5/2010 | Ozawa | G06F 3/04845 715/702 |
| 2010/0231546 | A1* | 9/2010 | Digon | G06F 3/0362 345/173 |
| 2010/0295805 | A1* | 11/2010 | Shin | G06F 3/04883 345/173 |
| 2012/0019485 | A1* | 1/2012 | Sato | G06F 3/017 345/175 |
| 2012/0144341 | A1* | 6/2012 | Torigoe | G06F 3/04883 715/784 |
| 2012/0173983 | A1* | 7/2012 | Song | G06F 3/04883 715/720 |
| 2013/0027300 | A1* | 1/2013 | Nakasu | G06F 3/017 345/158 |

FOREIGN PATENT DOCUMENTS

| | | |
|---|---|---|
| EP | 2 241 964 | 10/2010 |
| JP | 9-101874 | 4/1997 |
| JP | 2006-277666 | 10/2006 |
| JP | 2011-505045 | 2/2011 |
| JP | 2012-27851 | 2/2012 |
| JP | 2012-123563 | 6/2012 |
| JP | 2012-141978 | 7/2012 |
| JP | 2013-30134 | 2/2013 |
| WO | 2008/111245 | 9/2008 |
| WO | 2009/069049 A2 | 6/2009 |
| WO | 2009/069049 A3 | 6/2009 |

OTHER PUBLICATIONS

Extended European Search Report dated Aug. 14, 2015 in corresponding European Application No. 13833330.7.
Office Action dated Feb. 28, 2017 in European Patent Application No. 13833330.7.

* cited by examiner

FIG. 8
(a) Operation of moving pointer
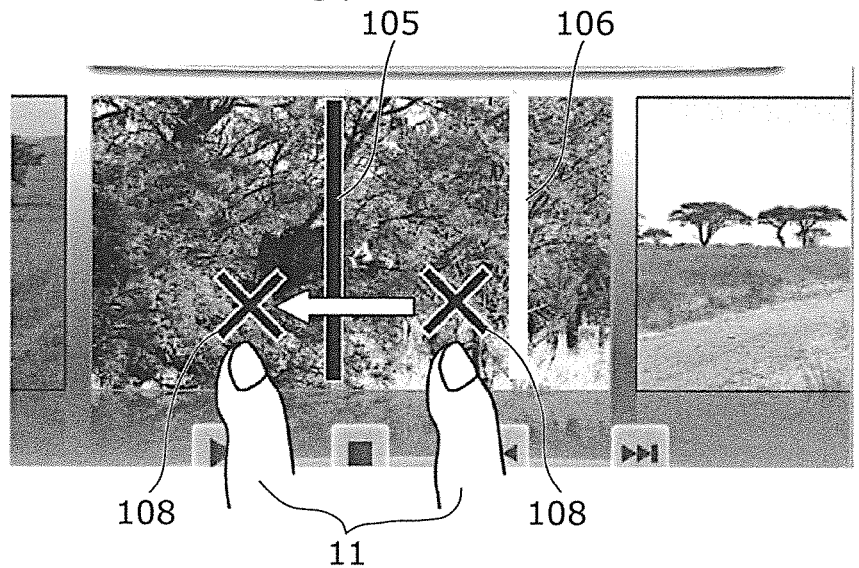
(b) Rotation operation
(c) Back-and-forth operation
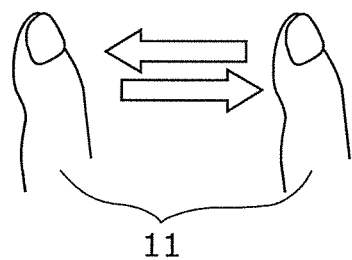

INFORMATION INPUT DEVICE AND INFORMATION DISPLAY METHOD

TECHNICAL FIELD

The present invention relates to an information input device and an information display method for providing a graphical user interface (GUI), more particularly, to a device which inputs information based on a position and so on of an indicator in a three-dimensional space, and a method for displaying the information.

BACKGROUND ART

With recent development in computer technology and advance in information terminals, various GUIs are proposed (for example, see Patent Literature (PTL) 1).

PTL 1 discloses a virtual sense presenting device which controls a scroll rate and a direction of scrolling by operating a pointer on a display screen when a positional relationship between the pointer and a scrolled image is brought into a predetermined relationship. According to this, a virtual sense presenting device can be provided which can reliably present virtual cutaneous sensation and force sensation and virtual sensation of balance.

CITATION LIST

Patent Literature

[PTL 1] International Publication WO2008/111245

SUMMARY OF INVENTION

Technical Problem

In the technology of PTL 1, however, although a user unintentionally moves the pointer without a plan to operate, scrolling undesirably starts when the positional relationship between the pointer and a scrolled image is accidentally brought into the predetermined relationship. Therefore, a problem arises that a function unintended by the user is undesirably executed.

Thus, the present invention is made in view of the above problem, and has an object to provide information input devices which avoid execution of a function of an apparatus which is unintended by a user and due to an accidental pointing operation.

Solution to Problem

To achieve the above object, one aspect of the information input device according to the present invention is an information input device for obtaining, from a user, an instruction for an image displayed on a display screen, the information input device including: an indicator detection unit configured to detect at least one of a position and an orientation of an indicator in a three-dimensional space; a pointer position setting unit configured to set a position on the display screen of a pointer to be displayed on the display screen, in correspondence with the at least one of the position and the orientation of the indicator in the three-dimensional space detected by the indicator detection unit; a storage unit configured to obtain and store time-sequenced positional information which indicates the position set by the pointer position setting unit; a first passage detection unit configured to detect that the pointer has passed through a first specific region which is a predetermined region on the display screen, using the time-sequenced positional information stored in the storage unit; a direction obtainment unit configured to obtain a direction in which the pointer has passed through the first specific region, if the first passage detection unit detects that the pointer has passed through the first specific region; and a first image modifying unit configured to modify the image displayed on the display screen, depending on the direction obtained by the direction obtainment unit.

Moreover, to achieve the above object, one aspect of an information display method according to the present invention is an information display method executed by a computer, the information display method including: (a) displaying one or more items on a display screen; and (b) obtaining an instruction from a user by detecting at least one of a position and an orientation of an indicator in a three-dimensional space, step (a) having: a first mode in which at least one item is selected from among the one or more items in accordance with the instruction from the user obtained in step (b); and a second mode in which a process involving modification of display of the at least one item selected in the first mode is performed, wherein if the instruction from the user obtained in step (b) is to cause movement from one of two or more regions set on the display screen to any of remaining regions, the first mode is switched to the second mode or the second mode is switched to the first mode.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

According to the present invention, an information input device which avoids execution of a function of an apparatus, which is unintended by a user and due to an accidental pointing operation, is provided.

This implements a highly maneuverable GUI, which reliably reflects user intention. Thus, the present invention has significant practical value for its application today where information terminal devices are becoming widely popular.

BRIEF DESCRIPTION OF DRAWINGS

FIG. 8 shows diagrams illustrating an example user interaction depicting procedure for detecting a repetitive motion.

Figure 1:
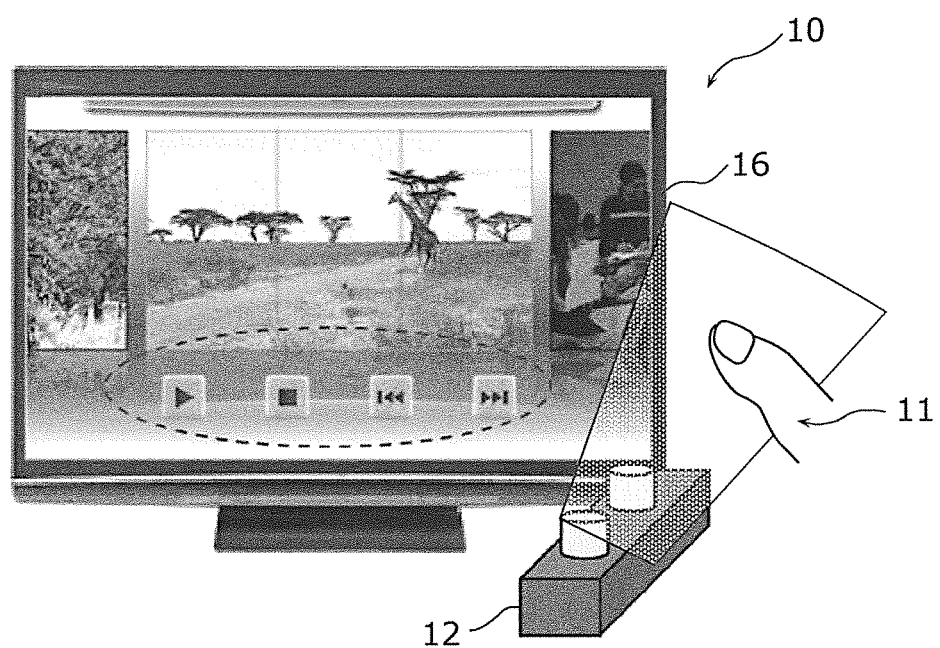
FIG. 1 is an external view of an information input device according to an embodiment of the present invention.

DESCRIPTION OF EMBODIMENTS (Overview of Present Invention)

To achieve the above object, one aspect of the information input device according to the present invention is an information input device for obtaining, from a user, an instruction for an image displayed on a display screen, the information input device including: an indicator detection unit configured to detect at least one of a position and an orientation of an indicator in a three-dimensional space; a pointer position setting unit configured to set a position on the display screen of a pointer to be displayed on the display screen, in correspondence with the at least one of the position and the orientation of the indicator in the three-dimensional space detected by the indicator detection unit; a storage unit configured to obtain and store time-sequenced positional information which indicates the position set by the pointer position setting unit; a first passage detection unit configured to detect that the pointer has passed through a first specific region which is a predetermined region on the display screen, using the time-sequenced positional information stored in the storage unit; a direction obtainment unit configured to obtain a direction in which the pointer has passed through the first specific region, if the first passage detection unit detects that the pointer has passed through the first specific region; and a first image modifying unit configured to modify the image displayed on the display screen, depending on the direction obtained by the direction obtainment unit.

This sets an action, if the pointer has passed through the first specific region, in accordance with a direction of the passage. Thus, an error, as with the conventional technology, in which a function of an apparatus unintended by the user is undesirably executed due to an accidental pointing operation can be avoided. In other words, the user can perform the pointing operation and the select operation as continuous and reliable operations.

Here, specifically, the first specific region may be configured with one or more line segments displayed on the display screen, the first passage detection unit may detect that the pointer has passed through one of the one or more line segments crosswise, and the first image modifying unit may scroll the image along the direction obtained by the direction obtainment unit. More particularly, the first specific region may be configured with two line segments displayed on the display screen, disposed in parallel with each other, the first passage detection unit may detect that the pointer has passed through one of the two line segments crosswise, and the direction obtainment unit may obtain the direction by determining which one of the two line segments through which the pointer has moved crosswise from a first region between the two line segments This distinguishes clearly between the scroll operation and usual pointing operations.

Moreover, the first specific region may be an icon displayed on the display screen, and if the direction obtained by the direction obtainment unit is a predetermined direction, the first image modifying unit may modify the image in such a manner that the icon is split into two or more partial icons. This distinguishes clearly between the icon selection operation and usual pointing operations.

Moreover, the information input device may further include a repetition detecting unit configured to detect that the pointer is in a repetitive motion on the display screen, using the time-sequenced positional information stored in the storage unit; a repetition detection enabling unit configured to disable the repetition detecting unit for detection, and enable the repetition detecting unit for detection after the first passage detection unit detects that the pointer has passed through the first specific region; and a second image modifying unit configured to repeatedly modify the image if an effective detection is performed by the repetition detecting unit. This avoids the necessity of the pointer, once passed through the first specific region, repeatedly passing through the first specific region again. A result similar to the pointer repeatedly passing through the first specific region is obtained by a predetermined repetitive operation being performed. Thus, the user can reliably perform the repetitive operation by simple operation and burden of the repetitive operation imposed on the user can be reduced.

As a specific example of the repetitive motion, the repetitive motion may include at least one of the pointer in a circular motion on the display screen and the pointer moving back and forth on the display screen.

Moreover, the repetition detecting unit may further detect an end of the repetitive motion, and the repetition detection enabling unit may further disable the repetition detecting unit for detection if the repetition detecting unit detects the end of the repetitive motion. The information input device may further include a second passage detection unit configured to detect that the pointer has passed through a second specific region which is predetermined on the display screen, using the time-sequenced positional information stored in the storage unit, wherein the repetition detection enabling unit is further configured to disable the repetition detecting unit for detection if the second passage detection unit detects that the pointer has passed through the second specific region. At this time, the second passage detection unit may further obtain a direction in which the pointer has passed through the second specific region, and the repetition detection enabling unit may disable the repetition detecting unit for detection if the second passage detection unit detects that the pointer has passed through the second specific region and the direction obtained by the second passage detection unit is a predetermined direction This allows the user to reliably end the repetitive motion.

Moreover, the information input device may further include a third image modifying unit configured to modify the second specific region, depending on a degree to which the second image modifying unit modifies the image. Specifically, modification of the image, which corresponds to the repetitive motion, may be scrolling the image and moving the pointer on the display screen, and the third image modifying unit may display an image indicative of a location of the second specific region by placing the second specific region farther away from the first specific region with increased rates at which the image is scrolled and the pointer is moved. This, for example, displays the second specific region for use in performing the operation of disabling the repetitive motion for detection, and adaptively changes the location where the second specific region is displayed. Thus, the repetitive operation can be ended reliably, without erroneous operation.

Moreover, the information input device may further include a direction setting unit configured to set a direction in which the pointer is to pass through the first specific region, in accordance with an attribute of the first specific region, wherein the first image modifying unit may modify the image if the direction obtained by the direction obtainment unit is the direction set by the direction setting unit. This narrows down the directions of passage of the pointer passing through the first specific region. Thus, for example, suppression of operational error and improvement in maneuverability are possible.

Moreover, as an adaptive example of the direction of passage, if the first specific region is disposed in contact with a side among sides forming a frame of the display screen, the direction setting unit may set a direction across the side as the direction in which the pointer is to pass through the first specific region, if the first specific region is disposed in contact with a side among sides forming a frame of the display screen, the direction setting unit may set a direction parallel with the side as the direction in which the pointer is to pass through the first specific region, and the direction setting unit may set the direction in which the pointer is to pass through the first specific region, in accordance with a density of a plurality of the first specific regions. This facilitates, when the plurality of first specific regions are disposed, reliable selection of one first specific region from among the plurality of first specific regions or bulk selection of the plurality of first specific regions by the user, for example.

Moreover, the information input device may further include a primary operational direction setting unit configured to set a primary operational direction of the user with respect to the image, based on an attribute of the first specific region, wherein the direction setting unit may set a direction, among directions exclusive of the primary operational direction set by the primary operational direction setting unit, as the direction in which the pointer is to pass through the first specific region. At this time, the information input device may further include a display screen state detection unit configured to detect a position and a posture of the display screen relative to the indicator detection unit, wherein the primary operational direction setting unit may set the primary operational direction, in accordance with the position and the posture detected by the display screen state detection unit. This distinguishes clearly between the primary operational direction and a direction of the select operation, for example, facilitating an operation of selecting an object from among a plurality of objects, scrolling the plurality of objects in the primary operational direction.

Moreover, the indicator detection unit may detect a posture of a hand or a finger of the user, and the direction setting unit may set the direction in which the pointer is to pass through the first specific region, in accordance with the posture detected by the indicator detection unit. This allows the user to perform, using a hand or a finger, the select operation in a direction easy for the operation.

Moreover, one aspect of an information display method according to the present invention may be an information display method executed by a computer, the information display method including: (a) displaying one or more items on a display screen; and (b) obtaining an instruction from a user by detecting at least one of a position and an orientation of an indicator in a three-dimensional space, step (a) having: a first mode in which at least one item is selected from among the one or more items in accordance with the instruction from the user obtained in step (b); and a second mode in which a process involving modification of display of the at least one item selected in the first mode is performed, wherein if the instruction from the user obtained in step (b) is to cause movement from one of two or more regions set on the display screen to any of remaining regions, the first mode is switched to the second mode or the second mode is switched to the first mode. This allows the user to switch a screen display where an object (an item) is selected and a screen display where a process to be performed on the selected object is set, by the continuous operations in a three-dimensional space. Moreover, the user can perform all operations simply by transitioning between the two display modes. Thus, as compared to a deeply layered menu, the operation is simple and the user can learn the method of operation in a short time.

Here, the two or more regions may include two regions partitioned by a line segment displayed on the display screen, and the movement may include a movement across the line segment.

Moreover, as details of the first mode, a plurality of groups may be displayed on the display screen in step (a), the groups each including at least one item, and in the first mode, a first group of the plurality of groups may be selectable and a second group of the plurality of groups may be not selectable. At this time, in the first mode, if the instruction from the user obtained in step (b) is to cause the movement, an item belonging to the first group may turn to belong to the second group, and is made not selectable.

Moreover, as details of the second mode, in the second mode, an icon associated with the process on the at least one item selected in the first mode may be displayed on the display screen, the icon may be associated with two or more regions, and the process associated with the icon may be performed if the instruction from the user obtained in step (b) is to cause movement from one of the two or more regions associated with the icon to any of remaining regions. At this time, the icon may assume a state where the process associated with the icon can be performed and a state where the process associated with the icon cannot be performed, depending on an attribute of the at least one item with which the icon is associated.

Moreover, step (a) may further have a third mode in which a menu is displayed, in step (a), if pointer movement indicated by the instruction from the user obtained in step (b) belongs to a first pattern, the first mode or the second mode, which is an original mode, may be switched to the third mode, and if the pointer movement indicated by the instruction from the user obtained in step (b) belongs to a second pattern, the third mode may be switched to the original mode. At this time, the number of the indicators in a three-dimensional space may be further detected in step (b), and the first pattern and the second pattern may be user instructions using a different number of the indicators. This provides the third mode in which operations common to the first mode and the second mode are displayed. Thus, menu in the first mode and the second mode is simplified, improving maneuverability. Moreover, in the three modes, transition is possible from any of the three modes to any of the remaining modes, thereby allowing the user to accomplish a desired process, without being tied up by burdensome rules for switching screens.

The general and specific aspects described above may be implemented using a system, a method, an integrated circuit, a computer program, or a computer-readable recording medium such as a CD-ROM, or any combination of systems, methods, integrated circuits, computer programs, or computer-readable recording media.

Hereinafter, an information input device and an information display method according to one aspect of the present invention will be specifically described, with reference to the accompanying drawings.

It should be noted that the embodiment and examples described below are each merely a preferred illustration of the present invention. Values, shapes, materials, components, disposition or a form of connection between the components, steps, the order of the steps, and example screen displays shown in the embodiment and examples below are merely illustrative, and are not intended to limit the present invention. Moreover, among components of the embodiment and examples below, components not set forth in the independent claims indicating the top level concept of the present disclosure will be described as optional components.

(Embodiment)

First, a configuration and basic functionalities of an information input device 10 according to the present invention which are common to specific examples 1, 2, and 3 set forth below will be described, with reference to the present embodiment. Thereafter, the examples 1 to 3 will be described by way of specific examples of the present embodiment.

The present embodiment is an information input device which provides a GUI which receives, as input information, at least one of the position and orientation of an indicator in a three-dimensional space detected by cameras. For such an information input device which receives the positions in the three-dimensional space as input information, there is no intuitive and direct manipulation which performs "select (or, set)" operation, unlike input using a mouse and a touch panel. In particular, in order to perform pointing (i.e., a pointer moving) operation, certain strategies are required in implementing the pointing operation and the select operation as continuous operations.

Here, an approach is contemplated which isolates the pointing operation and the select operation from each other by recognizing that the select operation is performed if a user makes a specific gesture. For example, an approach is contemplated which isolates the pointing operation and the select operation from each other by recognizing that the select operation is performed if a user makes a specific gesture of holding the palm stationary relative to an object for a fixed time period. Such an approach, however, requires the indicator to be held stationary relative to the object during the pointing operation to move the indicator. This has little immediacy and is not a comfortable operation.

Moreover, another approach is also contemplated which recognizes that the select operation is performed if a user makes a specific gesture such as swinging the hand in circle or pushing the hand frontward. In such an approach, however, the operation is recognized relying on the recognition rate of the gesture or display resolution in the depth direction. Thus, the reliable operation is not achieved.

Furthermore, still another approach is also contemplated which recognizes the select operation, using another modal such as a user uttering "Set!." However, an approach using voice recognition is expensive due to the equipment such as a microphone, and also depends on the voice recognition rate. Thus, reliable operation is not achieved.

Hence, in the present embodiment, an information input device which implements the pointing operation and the select operation as continuous and reliable operations will be described.

FIG. 1 is an external view of the information input device 10 according to the embodiment of the present invention. Herein, a stereo camera 12 and a display screen 16 are illustrated. A user moves an indicator 11 (herein, a user's finger) within an imaging range of the stereo camera 12, thereby moving, on the display screen 16, a pointer which is displayed in correspondence with a position of the indicator 11 in the three-dimensional space. This implements various interactions between the user and an image displayed on the display screen 16.

It should be noted that the indicator 11 is not limited to the user's finger, and may be the user's hand, arm, or an article such as a pen held by the user.

Figure 2:
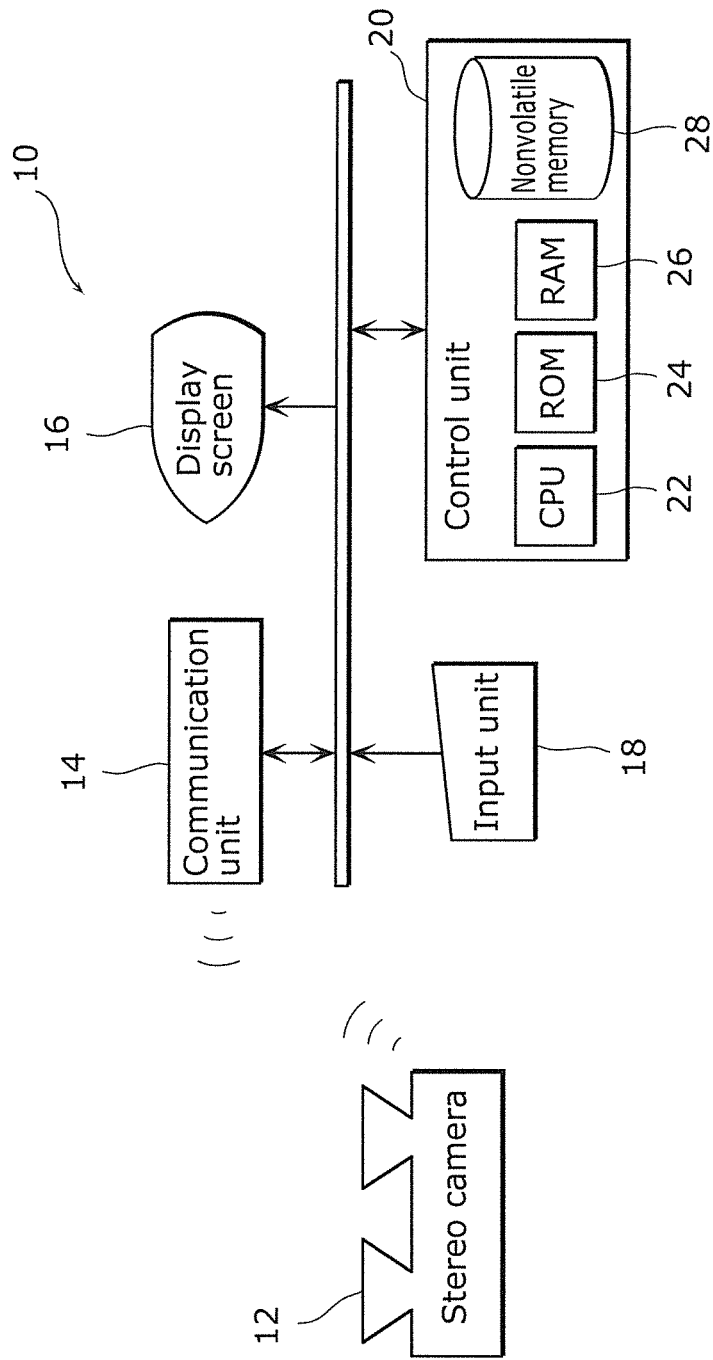
FIG. 2 is a hardware block diagram of the information input device.

FIG. 2 is a hardware block diagram of the information input device 10 according to the present embodiment.

The information input device 10 is a device which obtains user instructions for an image displayed on the display screen 16. The information input device 10 includes the stereo camera 12, a communication unit 14, the display screen 16, an input unit 18, and a control unit 20.

The stereo camera 12 is an imaging device which includes at least two cameras. The stereo camera 12 is a sensor for detecting at least one of the position and orientation of the indicator 11 (both the position and orientation in the present embodiment) in the three-dimensional space. In the present embodiment, the stereo camera 12 captures images of the indicator 11 at a fixed frame rate, and wirelessly transmits the two obtained images to the communication unit 14. While in the present embodiment, the stereo camera 12 is a device independent of the display screen 16 and so on, it should be noted that the stereo camera 12 may be incorporated in a device which includes the display screen 16. For example, the stereo camera 12 may be provided in a frame enclosing a display screen of a TV.

The communication unit 14 is a wireless communication interface or the like which, for example, obtains images sent from the stereo camera 12 and sends them to the control unit 20.

The display screen 16 is a liquid crystal display or the like for displaying an image to be presented to the user.

The input unit 18 is an input device, such as a button for powering the information input device 10 on or a remote controller. It should be noted that in the present embodiment, every instruction is provided to the control unit 20 via the stereo camera 12, and thus the input unit 18 is a preliminary component.

The control unit 20 is a computer which performs information processing to implement interactions with the user. The control unit 20 includes a CPU 22, a ROM 24, a RAM 26, and a nonvolatile memory 28. The CPU 22 is a processor which executes programs. The ROM 24 is a read-only memory previously storing programs and data. The RAM 26 is a memory for temporary storage of work data which is used when the CPU 22 executes the programs. The nonvolatile memory 28 is a read and write memory storing programs and data, such as a hard disk device which can store data even when the power is off.

It should be noted that the information input device 10 may include, as a necessary hardware component, the control unit 20, more specifically, a computer which executes programs. It is because the information input device according to the present invention is, typically, implemented in software. Thus, other peripheral devices are optional components, and may be equipped, as necessary, with the information input device according to the present invention. The ROM 24 and the nonvolatile memory 28 are nonvolatile memory devices and either one of them may be equipped.

Figure 3:
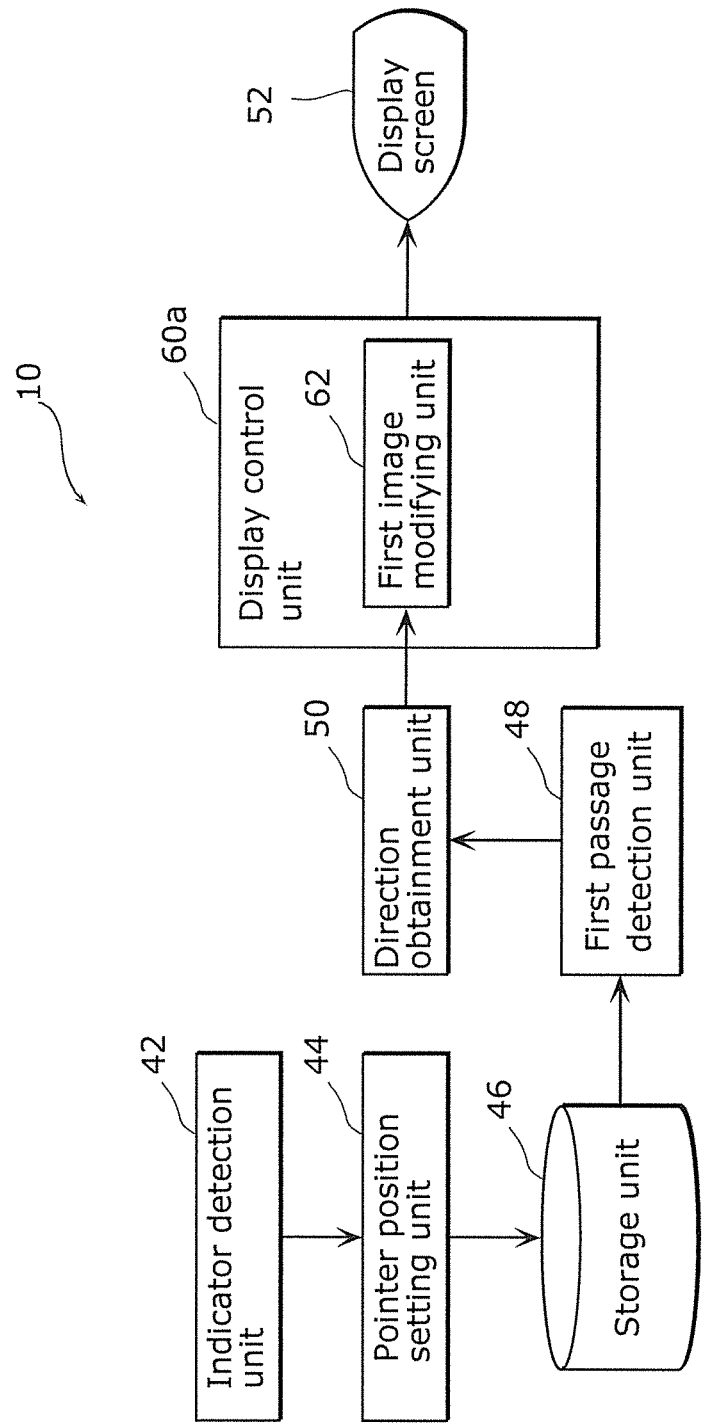
FIG. 3 is a functional block diagram of the information input device.

FIG. 3 is a functional block diagram of the information input device 10 according to the present embodiment. Herein, a functional configuration of the information input device 10 implemented in the hardware configuration illustrated in FIG. 2 is shown.

The information input device 10 is, functionally, a device which obtains user operations for an image displayed on a display screen 52. The information input device 10 includes an indicator detection unit 42, a pointer position setting unit 44, a storage unit 46, a first passage detection unit 48, a direction obtainment unit 50, a display control unit 60a, and the display screen 52. It should be noted that the display screen 52 corresponds to the display screen 16 of FIG. 2, and, as mentioned earlier, may not necessarily be included in the information input device 10.

The indicator detection unit 42 is a processing unit which detects at least one of the position and orientation of the indicator 11 in the three-dimensional space. The indicator detection unit 42 is implemented by the stereo camera 12, the communication unit 14, and the control unit 20 illustrated in FIG. 2. For example, if one hand with the index finger extended and the other fingers closed is predetermined as the indicator 11, the indicator detection unit 42 recognizes a shape of the hand including that of the index finger in two images which are captured simultaneously, and detects the position and orientation of the indicator 11 in the three-dimensional space from the position and orientation of the indicator 11 in each image by image matching and the like, using the positions and a distance between two cameras incorporated in the stereo camera 12 in the three-dimensional space.

The pointer position setting unit 44 is a processing unit which sets a position of the pointer in the display screen 52 to be displayed on the display screen 52 in correspondence with at least one of the position and orientation of the indicator in the three-dimensional space which are detected by the indicator detection unit 42. The pointer position setting unit 44 is implemented in the control unit 20 of FIG. 2. For example, in use of the position and orientation of the indicator 11 in the three-dimensional space, the pointer position setting unit 44 locates a position designated by the indicator 11 on a virtual two-dimensional operation plane preset in the three-dimensional space, and displays the pointer in a specific shape (for example, cross), and/or a specific color (for example, red) on the display screen 52 at a position corresponding to the designated position. In use of only the position of the indicator 11 in the three-dimensional space, the pointer position setting unit 44 locates a position designated by the indicator 11 on the preset two-dimensional operation plane when the position of the indicator 11 in the three-dimensional space is projected to the virtual two-dimensional operation plane, and displays the pointer on the display screen 52 at a position corresponding to the located position. In use of only the orientation of the indicator 11 in the three-dimensional space, the pointer position setting unit 44 pre-stores the correspondence between the orientation of the indicator 11 and the display screen 52, and displays the pointer on the display screen 52 at a position corresponding to the detected orientation of the indicator 11.

The storage unit 46 is a memory or the like which obtains and stores time-sequenced positional information which indicates positions set by the pointer position setting unit 44.

The storage unit 46 is implemented in the RAM 26 or the nonvolatile memory 28 of FIG. 2.

The first passage detection unit 48 is a processing unit which detects that the pointer has passed through a first specific region which is a predetermined region on the display screen 52, using the time-sequenced positional information stored in the storage unit 46. The first passage detection unit 48 is implemented in the control unit 20 of FIG. 2. The first specific region is a marker for use in recognizing a particular gesture operation of the user that is distinguished from mere movements of the pointer, and may or may not be displayed on the display screen 52 (insofar as the user previously knows where the first specific region is).

The direction obtainment unit 50 is a processing unit which obtains a direction in which the pointer has passed through the first specific region, if the first passage detection unit 48 has detected the passage. The direction obtainment unit 50 is implemented in the control unit 20 of FIG. 2.

The display control unit 60a is a processing unit which displays an image for use in interacting with the user on the display screen 52. The display control unit 60a is implemented in the control unit 20 of FIG. 2. The display control unit 60a includes a first image modifying unit 62. The first image modifying unit 62 is a processing unit which modifies an image displayed on the display screen 52, in accordance with the direction obtained by the direction obtainment unit 50. It should be noted that functionalities of the display control unit 60a except that of the first image modifying unit 62 are general image display functionalities, and, similarly to the display screen 52, may not be necessarily provided with the information input device 10.

Here, for example, the first specific region is configured with one or more line segments displayed on the display screen 52. In this case, the first passage detection unit 48 detects that the pointer has passed through one of the one or more line segments crosswise. Then the first image modifying unit 62, for example, scrolls an image along the direction obtained by the direction obtainment unit 50.

More specifically, for example, the first specific region is configured with two line segments displayed on the display screen 52, disposed in parallel with each other. In this case, the first passage detection unit 48 detects that the pointer has passed through one of the two line segments crosswise. Then, the direction obtainment unit 50 obtains a direction of its passage by determining which one of the two line segments through which the pointer has moved crosswise from a first region between the two line segments. Then, the first image modifying unit 62, for example, scrolls the image along the direction in which the pointer has passed through the line segment from the first region.

Moreover, as another example, the first specific region is an icon displayed on the display screen 52. In this case, if the direction obtained by the direction obtainment unit 50 is a predetermined direction, the first image modifying unit 62 modifies the image in such a manner that the icon is split into two or more partial icons. This can clearly convey to the user that the pointer has passed through the icon.

Next, operation of the information input device 10 according to the present embodiment configured as set forth above will be described.

Figure 4:
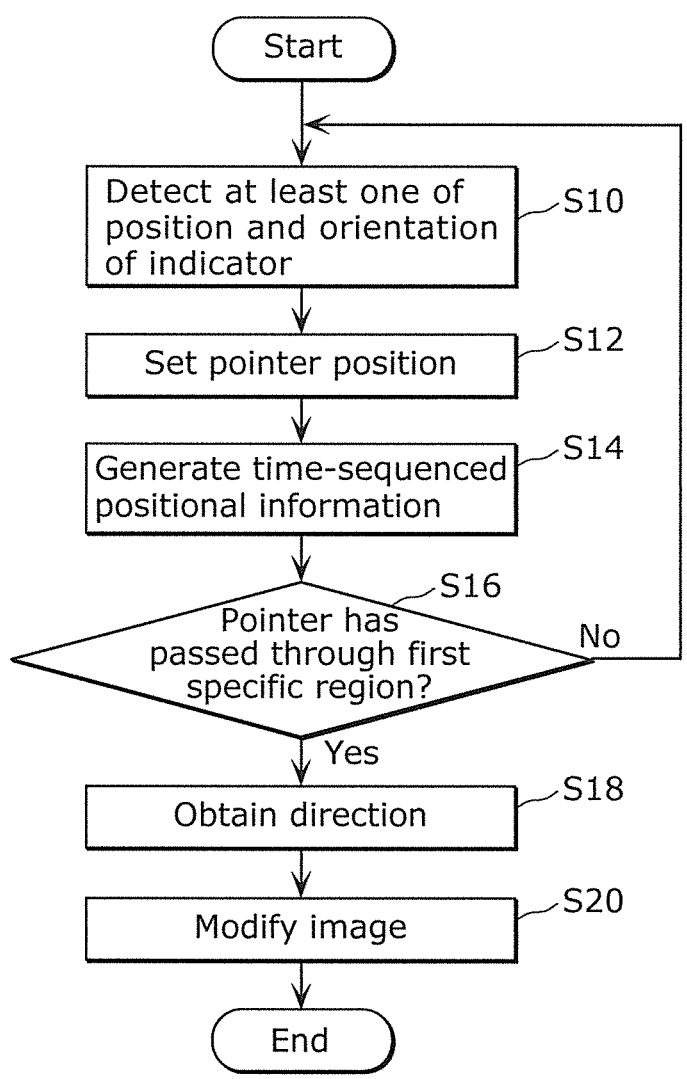
FIG. 4 is a flowchart illustrating operation of the information input device.
Figure 5A:
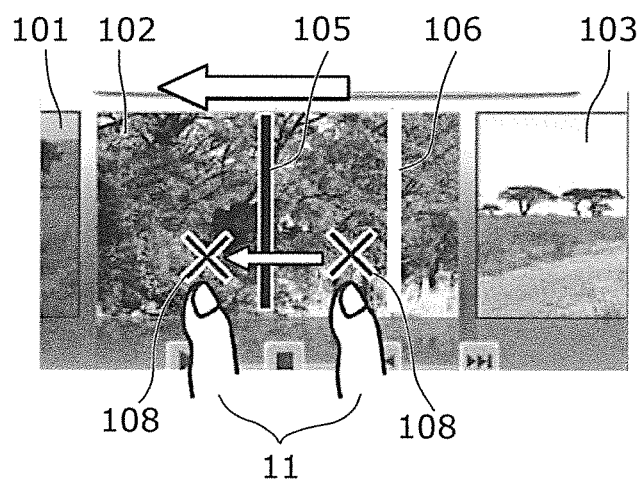
FIG. 5A is a diagram illustrating an example of characteristic operation (scrolling) of the information input device.
Figure 5B:
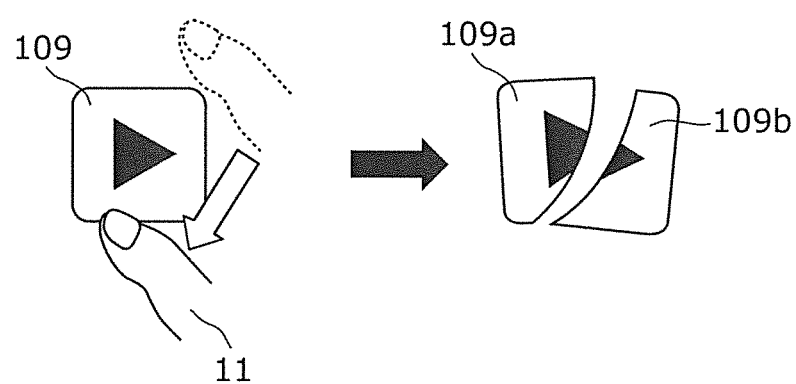
FIG. 5B is a diagram illustrating an example of characteristic operation (icon selection operation) of the information input device.

FIG. 4 is a flowchart illustrating the operation of the information input device 10 according to the present embodiment. FIGS. 5A and 5B are diagrams illustrating examples of characteristic operations (scrolling, and icon selection operation, respectively) of the information input device 10.

First, the indicator detection unit 42 detects at least one of a position and an orientation of the indicator 11 (both the position and orientation in the present embodiment) in the three-dimensional space (S10).

Once the indicator detection unit 42 detects the position and orientation of the indicator 11, the pointer position setting unit 44 sets a position of the pointer on the display screen 52 to be displayed on the display screen 52 in correspondence with the position and orientation detected by the indicator detection unit 42 (S12). The indicator detection unit 42 repeatedly detects the indicator 11 at regular time periods, thereby generating time-sequenced positional information which indicates the position of the pointer and storing it in the storage unit 46 (S14).

Using the time-sequenced positional information stored in the storage unit 46, the first passage detection unit 48 determines whether the pointer has passed through the first specific region which is a predetermined region on the display screen 52 (S16). If the passage is not detected (No in S16), the above steps S10 to S16 are repeated.

Once the first passage detection unit 48 detects the passage (Yes in S16), the direction obtainment unit 50 obtains a direction in which the pointer has passed through the first specific region (S18).

Then, the first image modifying unit 62 modifies the image displayed on the display screen 52, in accordance with the direction obtained by the direction obtainment unit 50 (S20).

FIG. 5A is an example of a GUI which is provided by the information input device 10, illustrating scrolling. Herein, three pictures 101, 102, and 103 are displayed laid out in the horizontal direction on the display screen 52. On an image indicative of the picture 102 in the middle, two line segments 105 and 106 are displayed by way of example of the first specific region, disposed in the vertical direction of the display screen 52 so as to be parallel with each other.

In the figure, a pointer 108 moved from a region between the two line segments 105 and 106 across the line segment 105 on the left of the region by the user moving the indicator 11 in the three-dimensional space. Once such an operation is performed, the first passage detection unit 48 detects that the pointer 108 has passed through the line segment 105, and, in accordance with a detection, the direction obtainment unit 50 determines the direction in which the pointer 108 has passed through the line segment 105, which is the first specific region, to be the left direction. Then, in accordance with the determination by the direction obtainment unit 50, the first image modifying unit 62 scrolls an image (a row of pictures) displayed on the display screen 52 to the left by a constant amount (for example, for one picture).

While the indicator 11 shown in the figure is illustrated touching the display screen 52, it should be noted that this is for facilitating an understanding of the indicator 11. The indicator 11 is, in fact, moved in a capture space (the three-dimensional space) of the stereo camera 12 shown in FIG. 1. The same is true hereinafter for the figures illustrating GUIs.

Moreover, herein, the directions, for example, "right (right side)," "left (left side)," "top (upper)," and "bottom (lower)," on the display screen 52 mean respective directions toward the display screen 52.

As such, as FIG. 5A shows, according to the information input device 10 of the present embodiment, the user can start scrolling the display to the left by performing the operation of moving the pointer from the center region to the left side region, while seeing the two line segments 105 and 106 and the pointer 108 displayed on the display screen 52. Thus, an error, as with the conventional technology, in which a function of an apparatus unintended by the user is undesirably executed due to an accidental pointing operation is avoided, and a highly maneuverable GUI which reliably reflects user intention is implemented.

FIG. 5B shows icon selection operation by way of example of a GUI which is provided by the information input device 10. Herein, an icon 109, indicating a button for playing in sequence the row of pictures shown in FIG. 5A, is displayed on the display screen 52. The icon 109 is by way of example of the first specific region.

In the figure, the pointer moved from top to bottom of the icon 109 (across the top side of the icon 109 and then the bottom side thereof) by the user moving the indicator 11 in the three-dimensional space. Once such an operation is performed, the first passage detection unit 48 detects that the pointer has passed through the icon 109, and, in accordance with the detection, the direction obtainment unit 50 determines that a direction in which the pointer 108 has passed through the icon 109, which is the first specific region, is from top to bottom (the direction across the top side of the icon 109 and then the bottom side). Then, in accordance with a result of the determination by the direction obtainment unit 50, the first image modifying unit 62 replaces the displayed icon 109 with two icons 109a and 109b representing the split icon 109 on the display screen 52. This allows the user to know that the user has successfully performed the operation of selecting the icon 109 (an operation corresponding to a click by operating a mouse or touch on a touch panel).

As such, as FIG. 5B shows, according to the information input device 10 of the present embodiment, the user can select the icon 109 by performing the operation of passing the pointer through the icon 109 from top to bottom, while seeing the icon 109 and the pointer displayed on the display screen 52. Thus, the error, as with the conventional technology, in which a function of an apparatus unintended by the user is executed due to an accidental pointing operation is avoided, and a highly maneuverable GUI which reliably reflects user intention is implemented.

It should be noted that operation after the icon 109 is selected is operation by the control unit 20 and so on depending on application software displaying these pictures. For example, a slideshow of a photo collection associated with a centrally displayed picture starts.

As described above, according to the information input device 10 of the present embodiment, the image is modified in accordance with a direction of passage in which the pointer has passed through the first specific region displayed on the display screen 52. Thus, the error, as with the conventional technology, in which a function of an apparatus unintended by the user is executed due to an accidental pointing operation is avoided.

Moreover, according to the information input device 10 of the present embodiment, despite that the position and so on of the indicator 11 detected by the camera in the three-dimensional space are used as the input information, "moving the pointer to a specific position" and "operation of executing a function (determination of decision operation)" can be distinctively performed. In other words, according to the present embodiment, if the pointer has passed through the first specific region displayed on the display screen 52 in a predetermined direction, it is determined that the user conducted a decision operation. Thus, the user can readily perform the select or decision operation which corresponds to a mouse click or touch on a touch panel, while seeing the display screen 52.

It should be noted that in the present embodiment, the first passage detection unit 48 may be a processing unit which, using the time-sequenced positional information stored in the storage unit 46, detects that the pointer has passed through the first specific region, which is a predetermined region, on the display screen 52, at a rate or acceleration greater than a predetermined value. According to such a configuration, the first image modifying unit 62 modifies an image displayed on the display screen 52 only when the pointer has passed through the first specific region at the rate or acceleration greater than the predetermined value. In other words, in order to modify the image displayed on the display screen 52, the user is required to quickly move the indicator 11 with respect to the first specific region. This reduces the probability of occurrence of malfunctions which is unintended by the user and due to an accidental pointing operation.

EXAMPLE 1

Next, an example 1 will be described as a first specific example of the above-described embodiment.

In the above-described embodiment, one setting operation is associated which one action. For example, as the user performs one gesture operation of passing the pointer through the line segment, the user can scroll the display screen by the constant amount. However, for repeatedly causing such an action, the user needs to repeat the operation of passing the pointer through the line segment constantly in the same direction. In other words, the user needs to be constantly aware of the line segment when performing the operation. This imposes a large operational burden on the user. For example, to repeatedly perform scrolling to the left, the user needs to repeat an operation of passing the pointer through the line segment from the right side to the left side. In other words, the user needs to constantly return the pointer to the right side of the line segment with awareness. Hence, this imposes a large operational burden.

Thus, in the example 1, an improved information input device will be described which can reduce the burden of the repetitive operation.

Figure 6:
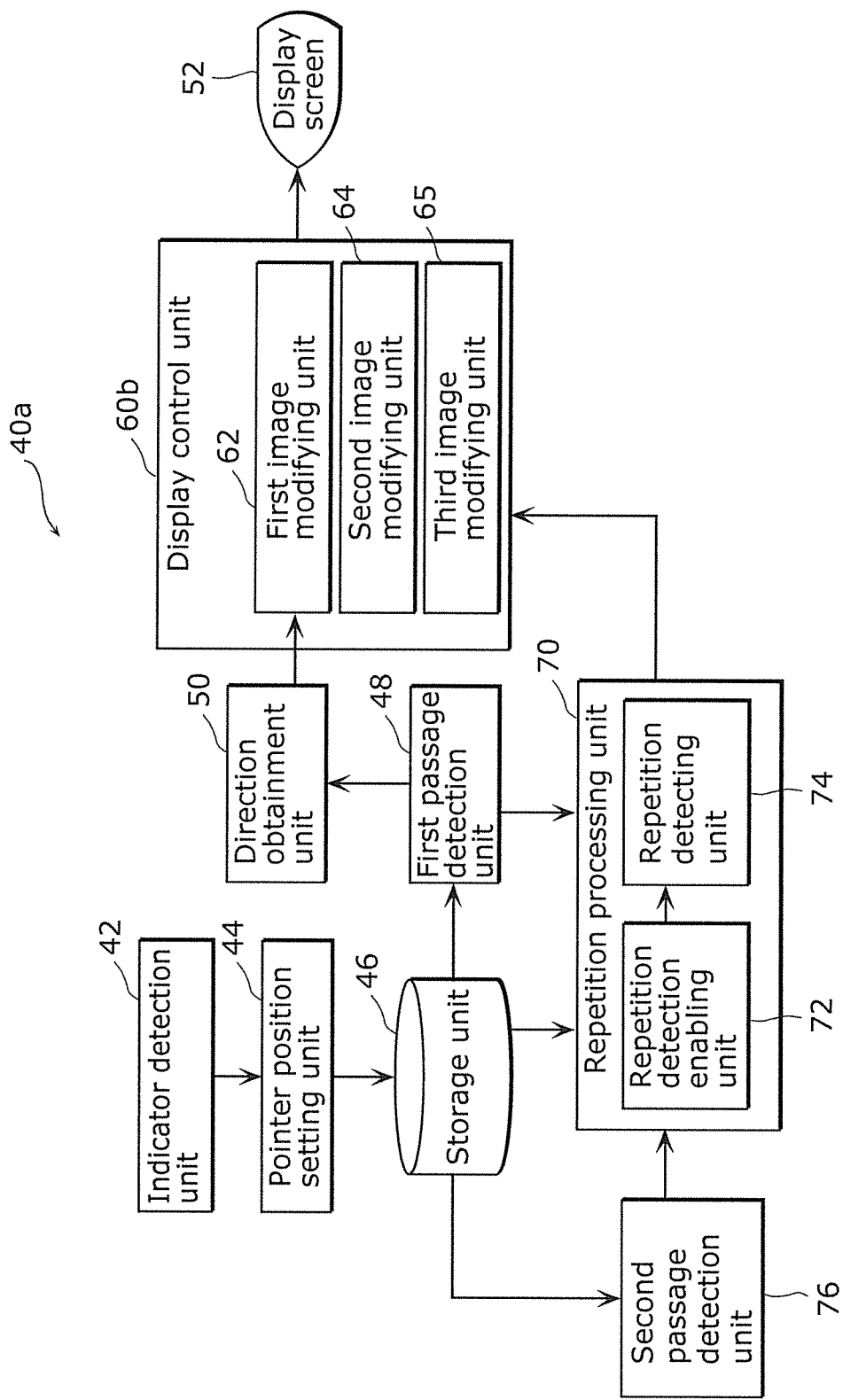
FIG. 6 is a functional block diagram of an information input device according to an example 1 of the present invention.

FIG. 6 is a functional block diagram of an information input device 40a in the example 1 of the present invention. It should be noted that the information input device 40a is a device, similarly to the above-described embodiment, which is implemented in the hardware configuration illustrated in FIG. 2. The information input device 40a is a device characterized in detecting the repetitive motion of the pointer. The information input device 40a functionally includes the indicator detection unit 42, the pointer position setting unit 44, the storage unit 46, the first passage detection unit 48, the direction obtainment unit 50, a display control unit 60b, the display screen 52, a repetition processing unit 70, and a second passage detection unit 76. It should be noted that the information input device 40a in the example 1 includes the second image modifying unit 64, a third image modifying unit 65, the repetition processing unit 70, and the second passage detection unit 76, in addition to the components included in the information input device 10 according to the above-described embodiment. In the following, differences of the example 1 from the above-described embodiment will be mainly described.

The repetition processing unit 70 is a processing unit which detects repetitive motion of the pointer on the display screen 52. The repetition processing unit 70 includes a repetition detection enabling unit 72 and a repetition detecting unit 74.

The repetition detecting unit 74 is a processing unit which detects that the pointer is in a repetitive motion on the display screen 52, using the time-sequenced positional information stored in the storage unit 46. The repetition detecting unit 74 is implemented in the control unit 20 of FIG. 2.

The repetition detection enabling unit 72 is a processing unit which disables the repetition detecting unit 74 for detection, and enables the repetition detecting unit 74 for detection after the first passage detection unit 48 detects a passage. The repetition detection enabling unit 72 is implemented in the control unit 20 of FIG. 2.

The display control unit 60b includes the second image modifying unit 64 and the third image modifying unit 65, in addition to the first image modifying unit 62 according to the above-described embodiment. If effective detection is performed by the repetition detecting unit 74, the second image modifying unit 64 repeatedly modifies the image corresponding to the repetitive operation, for example, repeatedly modifies the image, such as screen scrolling. The third image modifying unit 65 modifies a second specific region, in accordance with a degree of image modification by the second image modifying unit 64.

The second passage detection unit 76 is a processing unit which detects that the pointer has passed through a predetermined second specific region on the display screen 52, using the time-sequenced positional information stored in the storage unit 46. The second passage detection unit 76 is implemented in the control unit 20 of FIG. 2. If the second passage detection unit 76 detects the passage, the repetition detection enabling unit 72 disables the repetition detecting unit 74 for detection. The second specific region is a marker for use in ending the repetitive motion, and may or may not be displayed on the display screen 52 (insofar as the user previously knows where the second specific region is). Moreover, the second specific region is used in a different way from the first specific region but may be the same as the first specific region in terms of a region (location and shape) on the display screen 52.

The second passage detection unit 76 may further obtain a direction in which the pointer has passed through the second specific region. In this case, if the second passage detection unit 76 detects the passage and a direction obtained by the second passage detection unit 76 is a predetermined direction, the repetition detection enabling unit 72 disables the repetition detecting unit 74 for detection.

Here, specific examples of the repetitive motion include at least one of the pointer in a circular motion on the display screen 52 (i.e., rotation motion) and the pointer moving back and forth on the display screen 52 (i.e., back-and-forth motion).

Moreover, as an example of modifying the image, the second image modifying unit 64 repeatedly modifies the image along a direction obtained by the direction obtainment unit 50. Specifically, the second image modifying unit 64 scrolls the image on the display screen 52 by a constant amount, and moves the pointer by a constant amount, as the modification of the image.

Here, the repetition detecting unit 74 further detects the magnitude in amount of pointer movement (for example, the radius of a circle in the rotation motion, or an amplitude in back-and-forth motion) in the repetitive motion on the display screen 52. Then, the second image modifying unit 64 further increases the degree (for example, scroll granularity (unit in which the scrolling advances) or the scroll rate) of modification of the image with an increased amount of movement detected by the repetition detecting unit 74 is.

Moreover, the repetition detecting unit 74 further detects the end of the repetitive motion. For example, the repetition detecting unit 74 detects that the repetitive motion has ended, when the amount of pointer movement is smaller than a predetermined value. Then, the repetition detection enabling unit 72 disables the repetition detecting unit 74 for detection if the repetition detecting unit 74 detects the end of the repetitive motion.

It should be noted that the third image modifying unit 65 alters the second specific region, in accordance with the degree of image modification by the second image modifying unit 64. More particularly, the third image modifying unit 65 modifies an image (for example, a line segment) indicative of the second specific region on the display screen 52, in accordance with the degree of image modification by the second image modifying unit 64. Specifically, the third image modifying unit 65 modifies the image displayed on the display screen by changing the location of the image (for example, the line segment) indicative of the second specific region on the display screen in accordance with the degree of image modification by the second image modifying unit 64. Here, examples of image modification in response to the repetitive motion include image scrolling and pointer movement on the display screen 52. Then, the third image modifying unit 65 displays the image indicative of the location of the second specific region in such a manner that the greater the rates at which the image is scrolled and the pointer moves, farther away from the first specific region the third image modifying unit 65 places the second specific region. This is to prevent unintended erroneous operation such as causing the pointer to move beyond the second specific region which is a marker for ending the repetitive motion, due to a fact that the user overacts the operation as the user increases the speed of the repetitive motion.

Next, operation of the information input device 10 in this example configured as set forth above will be described.

Figure 7:
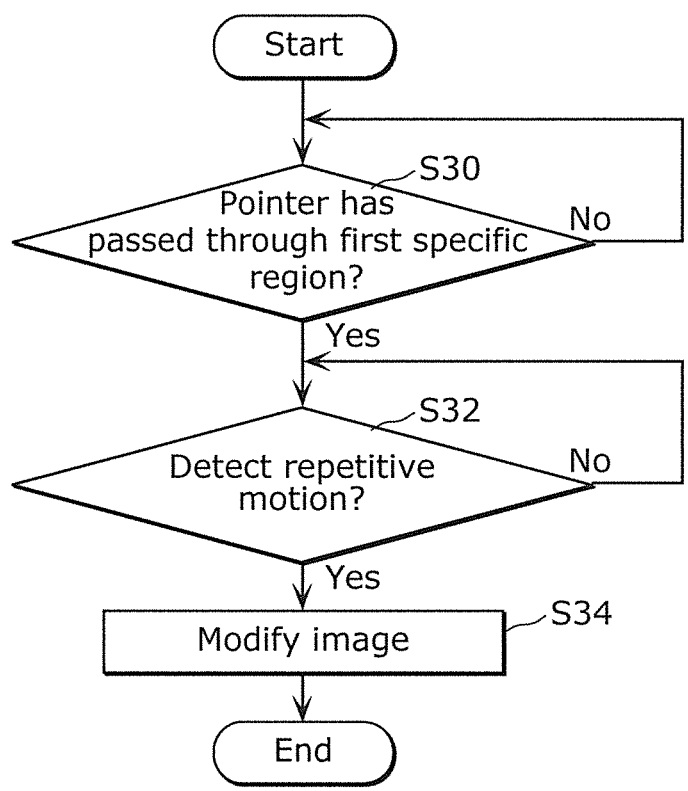
FIG. 7 is a diagram showing operation of the information input device.

FIG. 7 is a flowchart illustrating the operation of the information input device 40a in this example. Herein, procedure for detecting the repetitive motion by the information input device 40a is illustrated. FIG. 8 is a diagram showing an example user interaction depicting procedure for detecting the repetitive motion.

First, the repetition detection enabling unit 72 disables the repetition detecting unit 74 for detection, and the first passage detection unit 48 determines whether the pointer has passed through the first specific region (S30). This determination is repeated (No in S30) until, as (a) of FIG. 8 shows, it is determined that the pointer 108 has passed through the first specific region (herein, the line segment 105).

Once it is determined that the pointer has passed through the first specific region, the repetition detection enabling unit 72 enables the repetition detecting unit 74 for detection. As a result, if the user repeatedly performs the same action such as the rotation motion illustrated in (b) of FIG. 8 or the back-and-forth motion illustrated in (c) of FIG. 8, the action is so detected by the repetition detecting unit 74 (S32).

If effective detection is performed by the repetition detecting unit 74 (Yes in S32), the second image modifying unit 64 repeatedly modifies the image displayed on the display screen 52, in correspondence with the repetitive motion. For example, the second image modifying unit 64 repeats image scrolling to the left during the repetitive motion.

Figure 9:
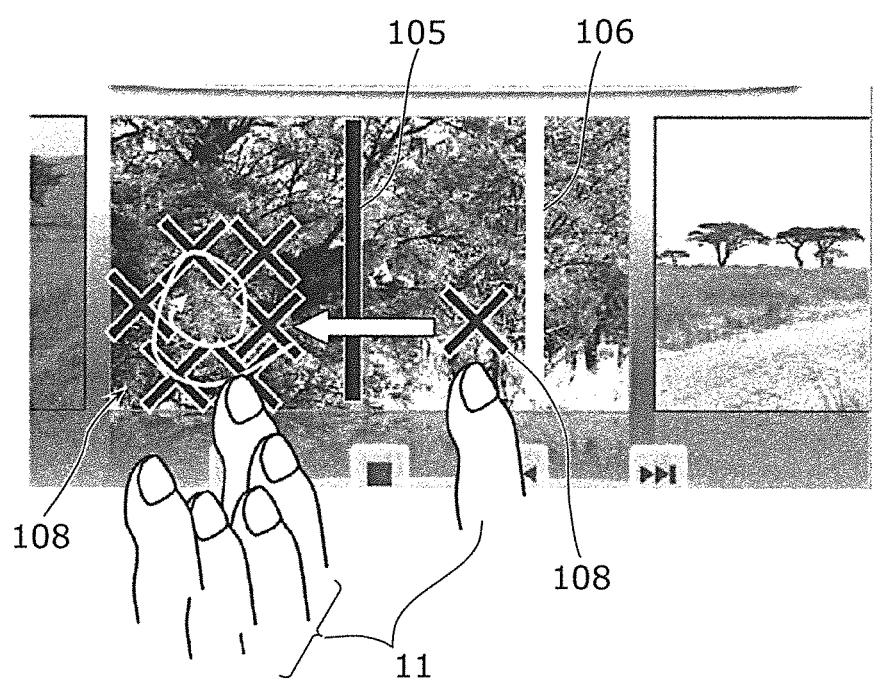
FIG. 9 is a diagram illustrating an example of typical user interaction in the repetitive motion.

FIG. 9 is a diagram illustrating an example of typical user interaction in the repetitive motion. By moving the indicator 11 in the three-dimensional space, the user moves the pointer 108 so as to pass the pointer 108 through the line segment 105 from the right side to the left side, and thereafter, performs the rotation motion on a region on the left side of the line segment 105. Then, the image displayed on the display screen 52 is repeatedly scrolled to the left.

As such, in this example, once the pointer has passed through the first specific region, the pointer is not required to repeatedly pass through the first specific region again. A result similar to the pointer repeatedly passing through the first specific region is obtained by a predetermined repetitive operation being performed. This allows the user to reliably perform the repetitive operation by simple operation and reduces burden of the repetitive operation imposed on the user.

Figure 10:
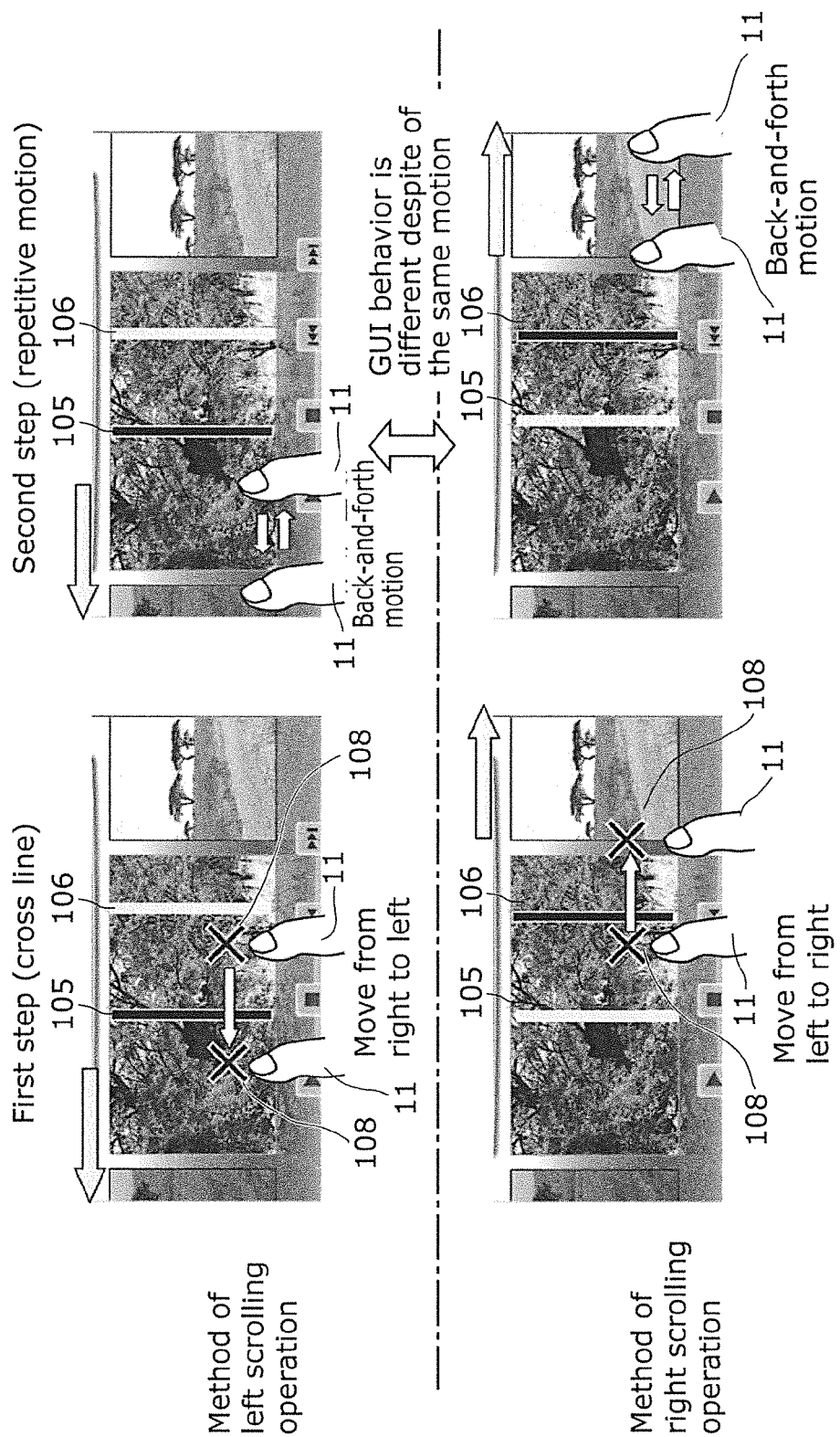
FIG. 10 shows diagrams illustrating an example user interaction in the repetitive motion by a back-and-forth motion.

FIG. 10 is a diagram showing an example user interaction in the repetitive motion by back-and-forth motion. In the example user interaction illustrated on the top row of FIG. 10, the user performs operation of passing the pointer 108 through the line segment 105 from the right side to the left side (to be accurate, from the center region between the two line segments 105 and 106 to a region on the left of the line segment 105), and thereafter performs the back-and-forth motion. In this case, the same result as repeatedly performing the operation of passing the pointer through the line segment 105 from the right side to the left side is obtained, that is, a scrolling display to the left is performed.

On the other hand, in the example user interaction illustrated on the bottom row of FIG. 10, the user performs operation of passing the pointer 108 through the line segment 106 from the left side to the right side (to be accurate, from the center region between the two line segments 105 and 106 to a region on the right of the line segment 106), and thereafter performs the back-and-forth motion. In this case, the same result as repeatedly performing the operation of passing the pointer through the line segment 106 from the left side of the line segment 106 to the right side is obtained, that is, a scrolling display to the right is performed.

Figure 11:
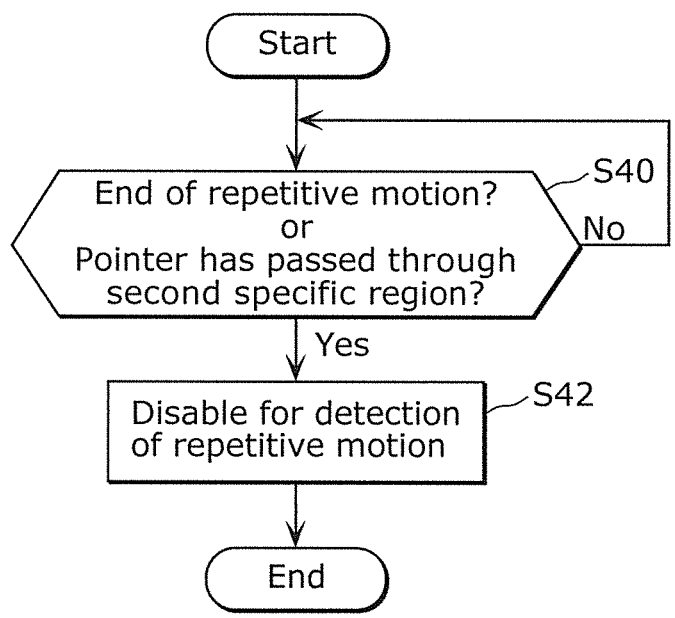
FIG. 11 is a flowchart illustrating an operation of the information input device, that is related to an end of the repetitive motion.
Figure 12A:
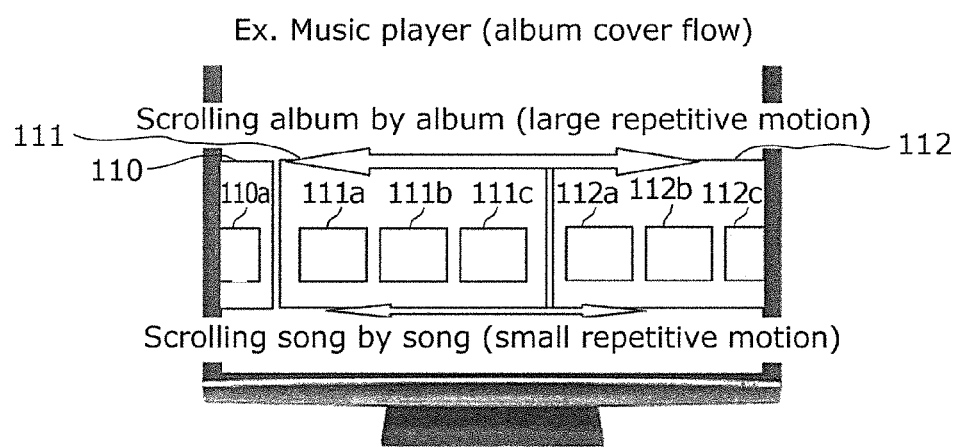
FIG. 12A is a diagram showing an example user interaction (immediately prior to an end operation) related to operation of ending the repetitive motion illustrated in FIG. 11.
Figure 12B:
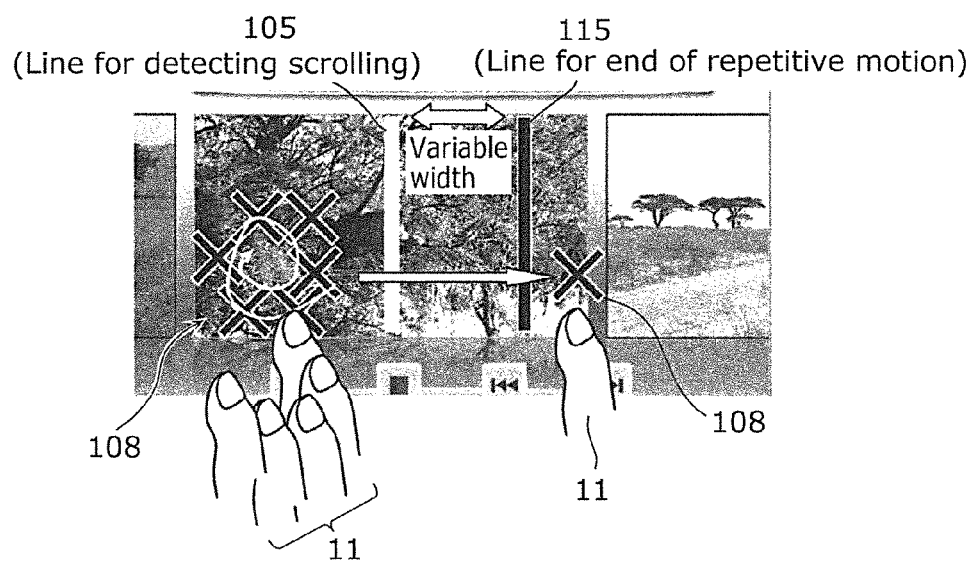
FIG. 12B is a diagram showing an example user interaction (the end operation) related to the operation of ending the repetitive motion illustrated in FIG. 11.

FIG. 11 is a flowchart illustrating an operation of the information input device 40a in this example that is related to ending the repetitive motion. FIGS. 12A and 12B are diagrams showing an example user interaction related to the operation of ending the repetitive motion illustrated in FIG. 11.

The repetition detection enabling unit 72 is watching whether the repetition detecting unit 74 detects an end of the repetitive motion, or whether the second passage detection unit 76 detects that the pointer has passed through the second specific region (S40). This watching is repeated (No in S40) until any of the above is detected.

It should be noted that when the second passage detection unit 76 detects a passage, it may also be detected, in addition to the detection of the passage, that the direction in which the pointer has passed through the second specific region is the predetermined direction. For example, if the pointer has passed through the second specific region from the left side to the right side during the repetitive motion, it may be detected that the repetitive motion has ended.

As a result, if the repetition detecting unit 74 detects the end of the repetitive motion or the second passage detection unit 76 detects that the pointer has passed through the second specific region (Yes in S40), the repetition detection enabling unit 72 disables the repetition detecting unit 74 for detection (S42). In other words, the repetition detection enabling unit 72 stops the repetition detecting unit 74 from detecting the repetitive motion.

Suppose, as a specific example user interaction, the repetitive motion of the pointer by the user is currently scrolling a row of images displayed side by side on the display screen 52 as FIG. 12A shows. Herein, images 110a, 111a to 111c, 112a to 112c corresponding to a plurality of pieces of music are laid out, and boxes 110, 111, and 112 enclosing images corresponding to respective albums each composed of a plurality of pieces of music are displayed. In scrolling, the scroll granularity is switched in accordance with the magnitude (for example, the radius of a circle in the rotation motion, or amplitude in back-and-forth motion) in amount of pointer movement in the repetitive motion on the display screen 52. For example, in a large magnitude of repetitive motion, display on the display screen 52 is scrolled album by album, while a display is scrolled song by song in a small magnitude of repetitive motion.

It should be noted that the magnitude of the repetitive motion may be defined by the duration the repetitive motion continues, or a rate at which the pointer moves in the repetitive motion on the display screen 52, for example. The display may be scrolled album by album if the duration the repetitive motion continues is long or the pointer quickly moves in the repetitive motion, and may be scrolled song by song if the duration the repetitive motion continues is short or the pointer slowly moves in the repetitive motion.

FIG. 12B is a diagram illustrating an example interaction by the user with the scrolling illustrated in FIG. 12A. Herein, during the scrolling, the user performs an operation of passing the pointer 108 through the line segment 115, which is by way of example of the second specific region, from the left side to the right side. Due to this, it is detected that the pointer 108 has passed through the second specific region in a specific direction, and the repetition detecting unit 74 is disabled for detection, thereby stopping the scrolling.

Figure 13:
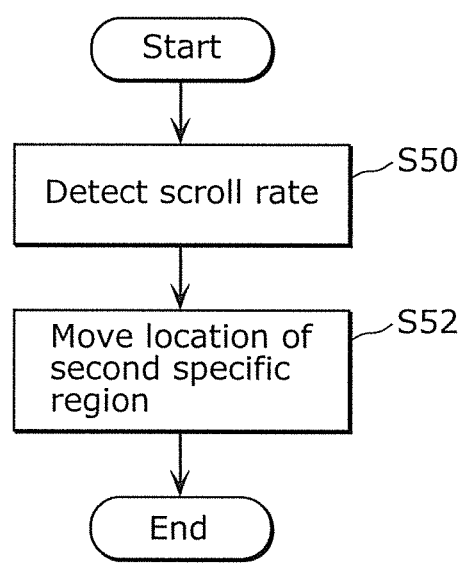
FIG. 13 is a flowchart illustrating an operation of the information input device, that is related to setting the location of a second specific region which is a marker for ending the repetitive motion.
Figure 14:
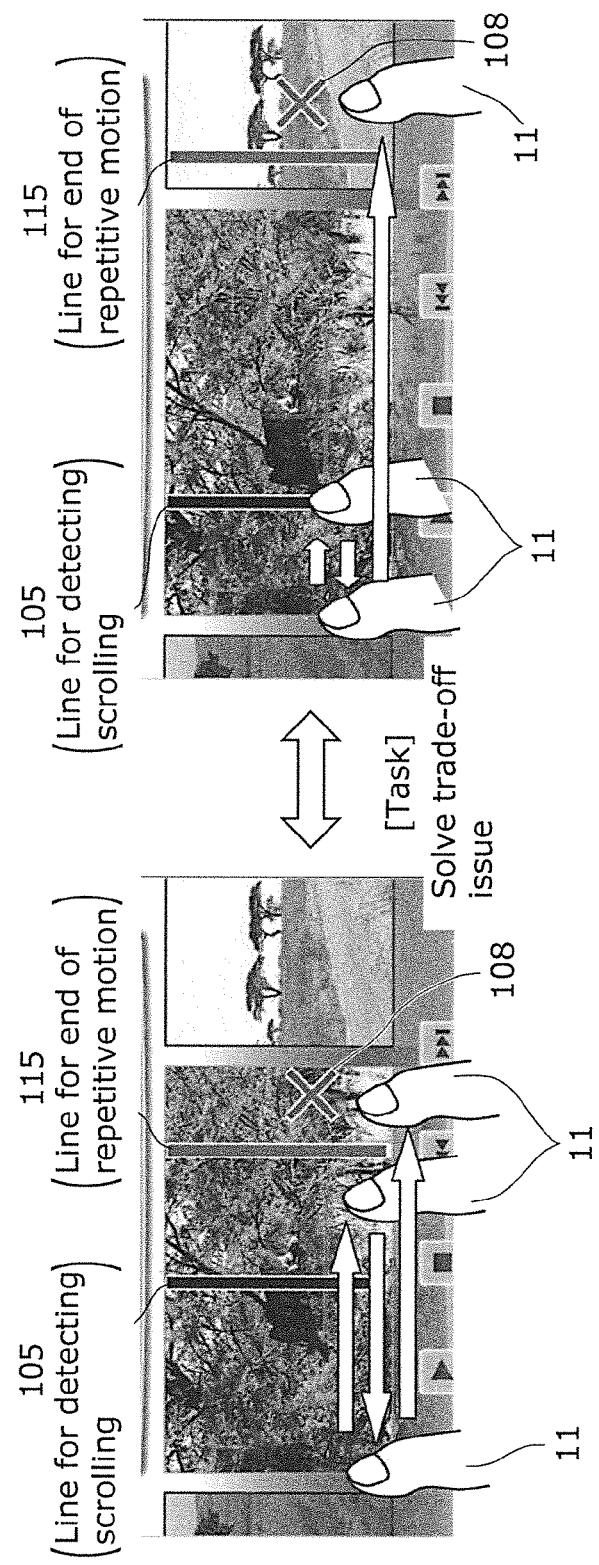
FIG. 14 shows diagrams illustrating an example user interaction in two cases where the locations of the second specific region illustrated in FIG. 13 are different.

FIG. 13 is a flowchart illustrating an operation of the information input device 40a in this example, that is related to setting the location of the second specific region which is a maker for ending the repetitive motion. FIG. 14 is a diagram illustrating an example user interaction in two cases where locations of the second specific region illustrated in FIG. 13 are different.

The third image modifying unit 65 detects a rate at which the image is scrolled (or, a rate at which the pointer moves) (S50), and moves the location where the second specific region is to be placed, in accordance with the rate (S52). For example, the greater a rate at which the image is scrolled (or, rate at which the pointer moves), farther away from the first specific region the third image modifying unit 65 places the second specific region.

The significance of such an operation is as shown in FIG. 14. In other words, without such a scheme in the operation, as the left panel of FIG. 14 shows, as the user increases the scroll rate, the user overacts the operation, for example, increasing the amplitude in the back-and-forth motion, and thereby the pointer 108 may inadvertently moves beyond the second specific region (herein, the line segment 115). In contrast, in this example, as the right panel of FIG. 14 shows, the location of the second specific region (herein, the line segment 115) is farther away from the first specific region (herein, the line segment 105) with an increased rate of scrolling. Thus, even if the user overacts the operation in attempt to increase the scroll rate, the pointer 108 is less likely to move beyond the second specific region (herein, the line segment 115) inadvertently.

As such, the location of the second specific region is dynamically changed in accordance with a degree of image modification due to the repetitive motion, thereby preventing operational error.

As described above, according to this example, when performing the repetitive operation, there is no need to repeatedly perform the operation of passing the pointer through the first specific region a number of times. By performing repetitive operation such as simple rotation operation and simple back-and-forth operation after one time of the operation of passing the pointer through the first specific region, a result similar to one obtained from continuously performing the operation that is performed one time can be obtained. This can reduce the burden of the repetitive operation. Moreover, since, for example, the second specific region for use in performing the operation of disabling the repetitive motion for detection is displayed and the location where the second specific region is displayed is adaptively changed, the repetitive operation can also be ended reliably, without erroneous operation.

Figure 15:
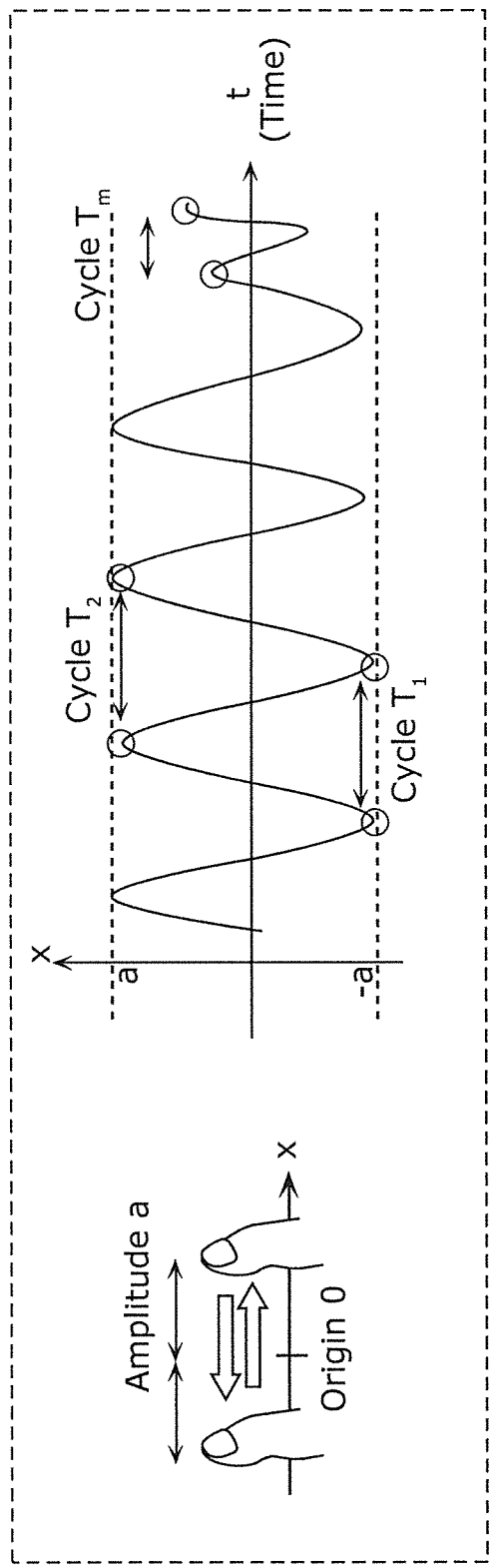
FIG. 15 is a diagram illustrating detection logic employed by a repetition detecting unit for the back-and-forth motion.

An example of detection logic for the back-and-forth motion employed by the repetition detecting unit 74 is as shown in FIG. 15. Specifically, all extreme values at a curve representing changes in position indicated by the time-sequenced positional information stored in the storage unit are identified, and a cycle between two continuous extreme values of the same type among the identified extreme values is calculated, thereby identifying changes in cycle over time. As a result, if the cycle does not significantly vary (i.e., the changes in cycle over time are within a predetermined range), it can be determined that the back-and-forth motion is in progress. For example, in FIG. 15, the cycle $T_1$ and the cycle $T_2$ do not significantly vary, at which time points it can be detected that the back-and-forth motion continues, while the cycle $T_m$ significantly varies at which time point it can be detected that the back-and-forth motion has ended.

Figure 16:
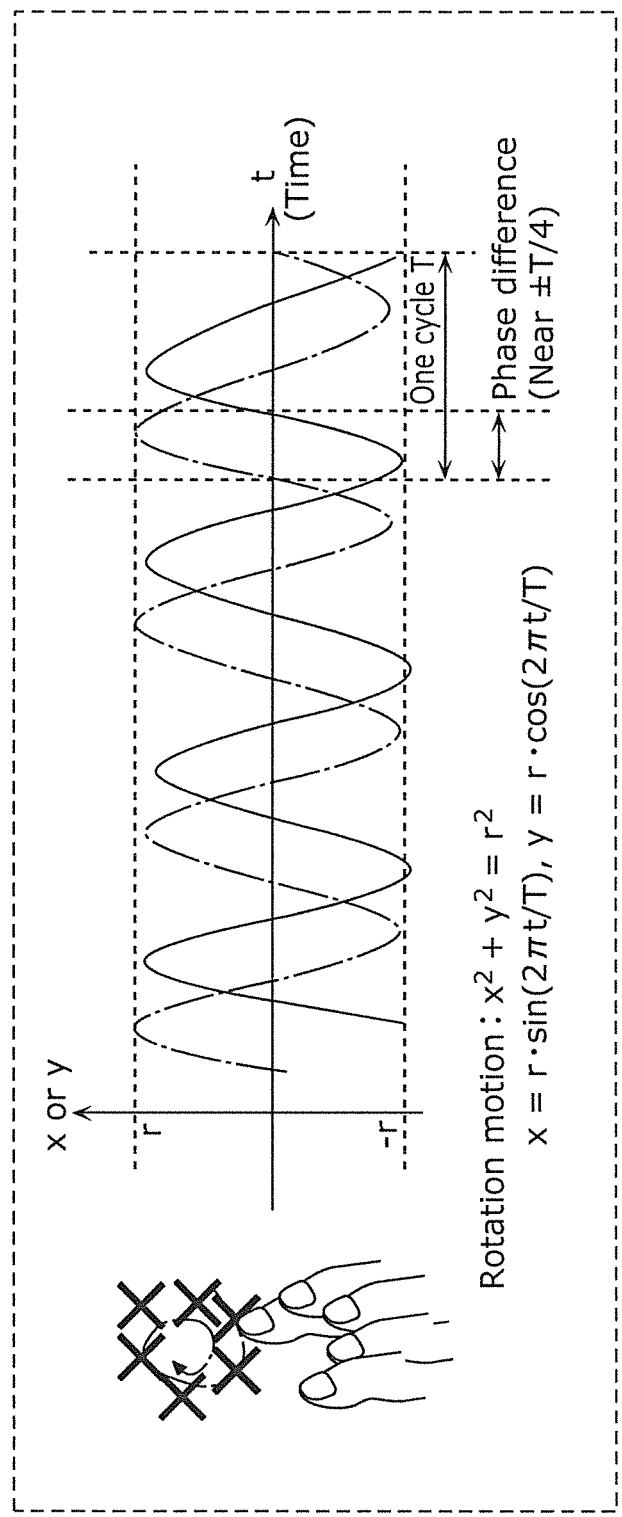
FIG. 16 is a diagram illustrating detection logic employed by the repetition detecting unit for a rotation motion.

Moreover, an example of detection logic for the rotation motion employed by the repetition detecting unit 74 is as shown in FIG. 16. Specifically, the logic calculates a curve representing changes in position in the x axis direction of the display screen 52 and a curve representing changes in position in the y axis direction of the display screen 52, based on the time-sequenced positional information stored in the storage unit 46. Then, based on both the curves, the cycle T and a phase difference between the curves are calculated. It can be detected that the rotation motion continues if the phase difference is near +T/4 or near −T/4.

EXAMPLE 2

Next, an example 2 will be described as a second specific example of the above-described embodiment, In the above-described embodiment, when the pointer has passed through the first specific region, an action is set in accordance with a direction of the passage. For example, the display is scrolled to the left if the pointer passes across a line segment from the right side to the left side, and the display is scrolled to the right if the pointer passes across a line segment from the left side to the right side. However, in the case where the first specific region is an icon and an action is defined in which the icon is selected when the pointer has passed through the icon, there exists, unlike line segments, various directions in which the pointer passes across the icon. Thus, icon selection unintended by the user can occur due to operational error.

Thus, in the example 2, description of an improved information input device will be given where directions of passage of the pointer in which an icon selection is valid are narrowed down based on an attribute of the icon or a state of the display screen (a position and a posture of the display screen), thereby suppressing operational error and improving maneuverability.

Figure 17:
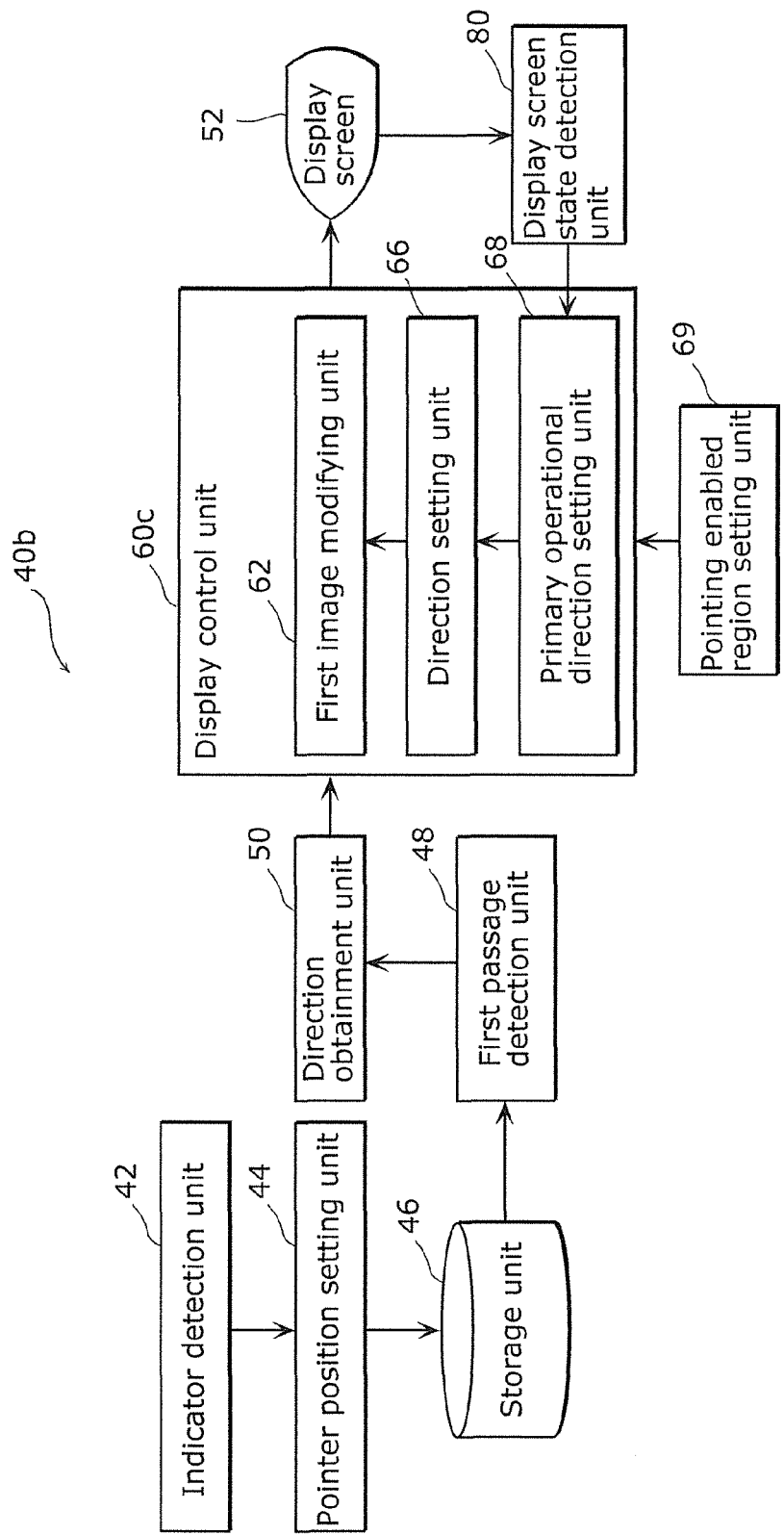
FIG. 17 is a functional block diagram of an information input device according to an example 2 of the present invention.

Here, examples of the attribute of the first specific regions, i.e., the attribute of icons include the density of icons, positions of the icons on the display screen 52, and how a plurality of icons are disposed, FIG. 17 is a functional block diagram of an information input device 40b according to the example 2 of the present invention. It should be noted that the information input device 40b is, as with the above-described embodiment, a device which is implemented in the hardware configuration illustrated in FIG. 2. The information input device 40b is a device characterized in setting, in accordance with various factors (or, dynamically), directions in which the pointer passes in the icon selection operation. The information input device 40b functionally includes the indicator detection unit 42, the pointer position setting unit 44, the storage unit 46, the first passage detection unit 48, the direction obtainment unit 50, a display control unit 60c, the display screen 52, a display screen state detection unit 80, and the pointing enabled region setting unit 69. The display control unit 60c includes the first image modifying unit 62, a direction setting unit 66, and a primary operational direction setting unit 68.

The information input device 40b in the example 2 includes the direction setting unit 66, the primary operational direction setting unit 68, the display screen state detection unit 80, and the pointing enabled region setting unit 69, in addition to the components included in the information input device 10 according to the above-described embodiment. In the following, differences of the example 2 from the above-described embodiment will be mainly described.

The display screen state detection unit 80 is a processing unit which detects a position and a posture of the display screen 52 in the three-dimensional space, relative to the indicator detection unit 42. The display screen state detection unit 80 is implemented in a three-axis acceleration sensor or the like which is incorporated in the display screen 16.

The pointing enabled region setting unit 69 is a processing unit which sets a region in which a position of the pointer to be displayed on the display screen 52 can be designated. The region is set based on an indicator detection range of the indicator detection unit 42.

The primary operational direction setting unit 68 is a processing unit which sets a primary operational direction of the user relative to an image, based on an attribute of an icon, which is the first specific region, and a state of the display screen 52. The primary operational direction setting unit 68 is implemented in the control unit 20 illustrated in FIG. 2. For example, the primary operational direction setting unit 68 sets the primary operational direction, in accordance with the position and posture of the display screen 52 which are detected by the display screen state detection unit 80.

The direction setting unit 66 is a processing unit which sets a direction in which the pointer is to pass through the first specific regions, in accordance with an attribute of the icon which is the first specific region. The direction setting unit 66 is implemented in the control unit 20 illustrated in FIG. 2. In other words, if a direction obtained by the direction obtainment unit 50 is the direction set by the direction setting unit 66, the first image modifying unit 62 determines that an effective operation (herein, the icon selection operation) has been performed, and modifies an image on the display screen 52.

More particularly, the direction setting unit 66 sets two directions as effective directions, i.e., a first direction and a second direction different from the first direction. Then, the first image modifying unit 62 determines that the icon selection operation has been performed, if the direction obtained by the direction obtainment unit 50 is the first direction and the direction obtained thereafter by the direction obtainment unit 50 is the second direction. Then, the first image modifying unit 62 modifies the image on the display screen 52. Furthermore, if the direction obtained by the direction obtainment unit 50 is the first direction, the first image modifying unit 62 may determine that the icon selection operation has been performed, and modify the image on the display screen 52. If the direction obtained thereafter by the direction obtainment unit 50 is the second direction, the first image modifying unit 62 may determine that the icon selection operation has been cancelled, and perform operation to cancel the modification of the image on the display screen 52. It should be noted that the first direction and the second direction are, for example, directions opposite to each other.

Moreover, the following aspects explain example dynamic determination of directions for various circumstances.

Specifically, as one direction determination example, if an icon is disposed in contact with a side among sides forming a frame of the display screen 52, the direction setting unit 66 sets directions across the sides as directions of the icon selection operation. In other words, among directions passing through the first specific region, directions across the frame (the side) of the display screen 52 with which the first specific region is in contact are set as the effective directions. Thus, directions always out of the display screen 52 are set as effective directions.

Moreover, as another direction determination example, if an icon is disposed in contact with a side among the sides forming the frame of the display screen 52, the direction setting unit 66 sets directions parallel with the side of the frame as directions of the icon selection operation. In other words, among directions passing through the first specific region, directions in parallel with the frame (the side) of the display screen 52 with which the first specific region is in contact are set as effective directions. This allows the icon selection operation to be detected in distinction from movements of the pointer going out and in the display screen 52.

Moreover, as still another direction determination example, if an icon is disposed in contact with a side among sides forming a frame of the pointing enabled region set by the pointing enabled region setting unit 69 on the display screen 52, the direction setting unit 66 sets directions across the side of the pointing enabled region, as directions of the icon selection. In other words, among directions passing through the icon, directions across the frame (the side) of the pointing enabled region with which the icon is in contact are set as effective directions. Thus, directions always out of the pointing enabled region are set as effective directions.

Moreover, as still another direction determination example, if an icon is disposed in contact with a side among the sides forming the frame of the pointing enabled region, the direction setting unit 66 sets directions parallel with the side as directions of the select operation. In other words, among directions passing through the icon, directions in parallel with the frame (the side) of the pointing enabled region with which the icon is in contact are set as effective directions. This sets directions in which the pointer is always movable within the pointing enabled region as effective directions. It should be noted that the direction setting unit 66 also includes functionality of setting directions of the icon selection operation in accordance with attributes of icons, such as the density of the icons (i.e., a degree to which a plurality of icons are close together on the display screen).

Moreover, as still another direction determination example, the direction setting unit 66 sets directions of the icon selection operation from directions exclusive of the primary operational direction that is set by the primary operational direction setting unit 68. In other words, among directions passing through an icon, directions, exclusive of the primary operational direction set by the primary operational direction setting unit 68, are set as effective directions. This allows the icon selection to be reliably detected in distinction from the primary operations such as scroll indication. For example, this facilitates operation of selecting one of a plurality of icons, while scrolling the icons in the primary operational direction.

Moreover, as still another direction determination example, the direction setting unit 66 sets a direction of the icon selection operation, in accordance with a posture of the indicator 11 detected by the indicator detection unit 42. For example, if the indicator 11 is a finger, the direction setting unit 66 sets directions orthogonal to a direction the finger is pointing, as effective directions. This sets a direction which is easier for the icon selection operation, as a direction in which the pointer moves in selecting icons. Thus, this improves maneuverability.

Next, operation of the information input device 40b in this example configured as set forth above will be described, with reference to flowcharts illustrated in FIGS. 18, 19, 20, and 21, and diagrams illustrating the example user interaction of FIGS. 22, 23, 24, 25, and 26.

Figure 18:
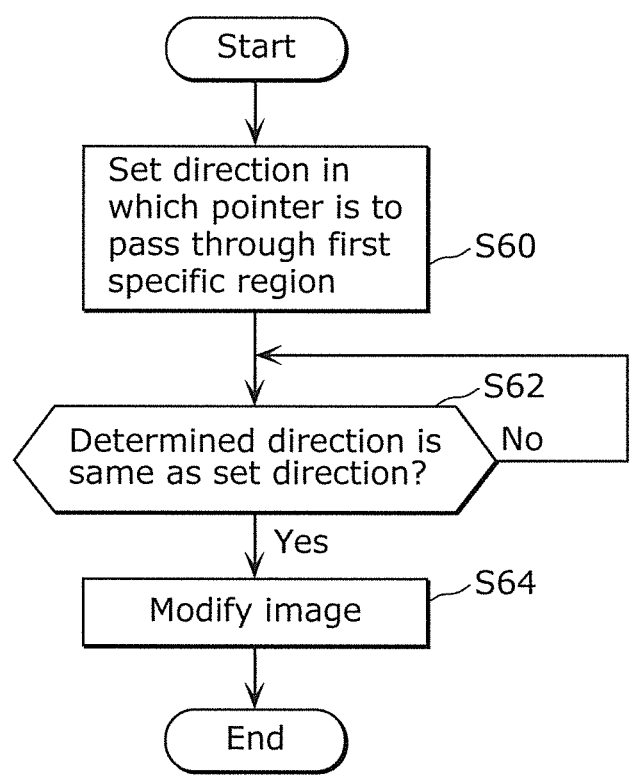
FIG. 18 is a flowchart illustrating basic operation of the information input device in the example 2.

FIG. 18 is a flowchart illustrating basic operation of the information input device 40b in this example.

The direction setting unit 66 sets a direction in which the pointer is to pass through the first specific region, in accordance with an attribute of an icon which is the first specific region (S60).

The first image modifying unit 62 determines whether the pointing operation by the user passes the pointer through an icon and a direction of movement of the pointer (i.e., a direction obtained by the direction obtainment unit 50) at the passage is the same as the direction set by the direction setting unit 66 (S62). This determination is repeated (No in S62) until it is determined that the direction of movement of the pointer when passing through the icon is the same as the direction set by the direction setting unit 66.

If it is determined that the direction of movement of the pointer when passing through the first specific region is the same as the direction set by the direction setting unit 66 (Yes in S62), the first image modifying unit 62 determines that an effective operation has been performed, and modifies an image on the display screen 52, that is, an image of the icon (S64).

For example, if the pointer passes through an icon which is a first specific region, at which time the direction of the pointer movement is the same as the direction set by the direction setting unit 66, the first image modifying unit 62 regards the icon as being selected, and, as FIG. 5B shows, displays the two icons 109a and 109b of the split icon 109 on the display screen 52, replacing the icon 109 previously displayed.

Due to this, icon selection operation is recognized as an effective operation only if the pointer has passed through the icon in a predetermined direction. Thus, the case where the pointer has passed through the icon in a direction other than the predetermined direction due to erroneous operation is ignored regarded as an operational error unintended by the user.

Figure 19:
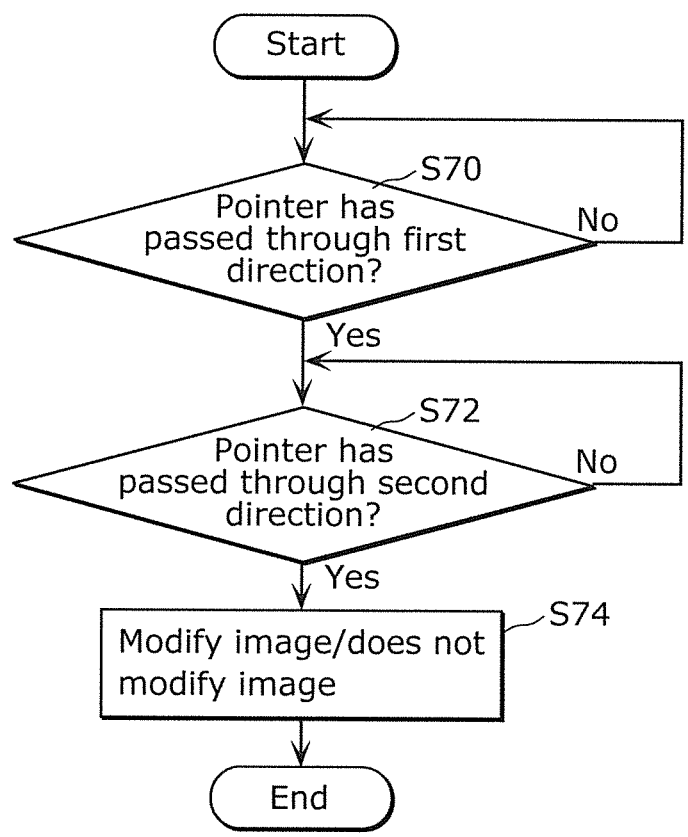
FIG. 19 is a flowchart illustrating an operation of the information input device in the example 2 when the pointer has passed in two predetermined directions.

FIG. 19 is a flowchart illustrating operation of the information input device 40b when the pointer passes through two predetermined directions in this example.

Suppose that two directions, i.e., the first direction and the second direction, are set by the direction setting unit 66 as effective directions in which the pointer is to pass through an icon which is a first specific region. For example, suppose that a direction passing through the first specific region from top to bottom is set as the first direction, and its opposite direction, i.e., a direction in which the pointer passes through the icon from bottom to top, is set as the second direction.

First, if the first passage detection unit 48 detects that the pointer has passed through the icon, the first image modifying unit 62 determines whether a direction, obtained by the direction obtainment unit 50, in which the pointer has passed through the icon is the first direction (S70). This determination is repeated (No in S70) until it is determined that a direction in which the pointer has passed through the icon is the first direction.

If it is determined that the direction in which the pointer has passed through the icon is the first direction (Yes in S70), the first image modifying unit 62 subsequently determines, if the first passage detection unit 48 detects that the pointer has passed through the icon, whether a direction obtained by the direction obtainment unit 50 in which the pointer has passed through the icon is the second direction (S72). This determination is repeated (No in S70) until it is determined that a direction in which the pointer passes again through the icon is the second direction. It should be noted that the determination as to the second direction (S72) may be made within a predetermined time period since the passage in the first direction (Yes in S70) is detected. In other words, if the passage in the second direction is not detected within the predetermined time period since the passage in the first direction (Yes in S70) is detected, the processing flow may be reset and detection of a passage in the first direction may be performed again (S70).

As a result, if it is determined that the direction in which the pointer has passed through the icon is the second direction (Yes in S72), the first image modifying unit 62 determines that the icon selection operation has been performed and modifies an image on the display screen 52, or determines that the icon selection operation has been cancelled and does not modify the image on the display screen 52 (S74). It should be noted that whether the image is to be modified is defined by preset by the user.

Figure 22:
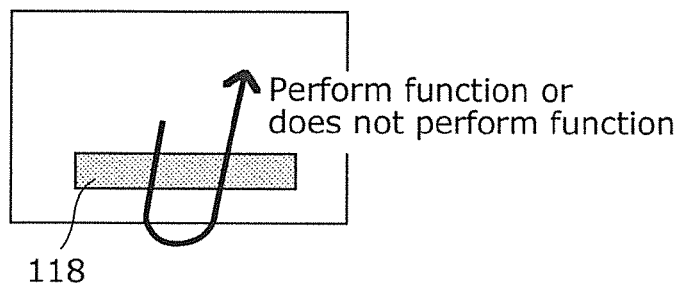
FIG. 22 is a diagram showing an example user interaction corresponding to the operation illustrated in FIG. 19.

FIG. 22 is a diagram showing an example user interaction corresponding to the operation illustrated in FIG. 19. The user moves the pointer so that the pointer passes through an icon 118 from top to bottom, and, subsequently, moves the pointer so that the pointer passes through the icon 118 from bottom to top. This allows, depending on the preset, the user to complete the selection of the icon 118 or cancel the selection of the icon 118 which has been provisionally selected by the movement of the pointer from top to bottom.

Figure 20:
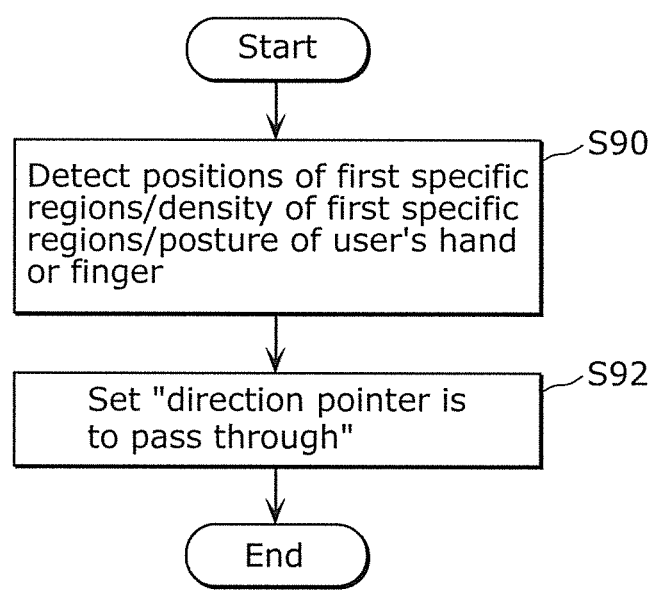
FIG. 20 is a flowchart illustrating basic operation of a direction setting unit included in the information input device in the example 2.

This completes a predetermined operation only if the pointer has passed through an icon in two different directions. Thus, operational error is prevented, as compared to the case where the operation is determined based on one direction, FIG. 20 is a flowchart illustrating the basic operation of the direction setting unit 66 included in the information input device 40*b* in this example.

First, the direction setting unit 66 detects attributes of icons which are first specific regions, for example, positions of the icons on the display screen 52 or the density of a plurality of icons (S90). Alternatively, the indicator detection unit 42 detects a posture of the indicator 11 such as a user' hand or finger (S90). It should be noted which of the three parameters (a position of an icon, the density of the icons, and a posture of the indicator 11) is effective is determined by preset by the user, at which time one of the three parameters may be effective or two or more of the parameters may be effective.

Then, the direction setting unit 66 sets directions (i.e., the directions of the icon selection operation) in which the pointer is to pass through an icon, in accordance with at least one of the detected position of the icon, the detected density of the icons, and the detected posture of the indicator 11 (S92).

Figure 23A:
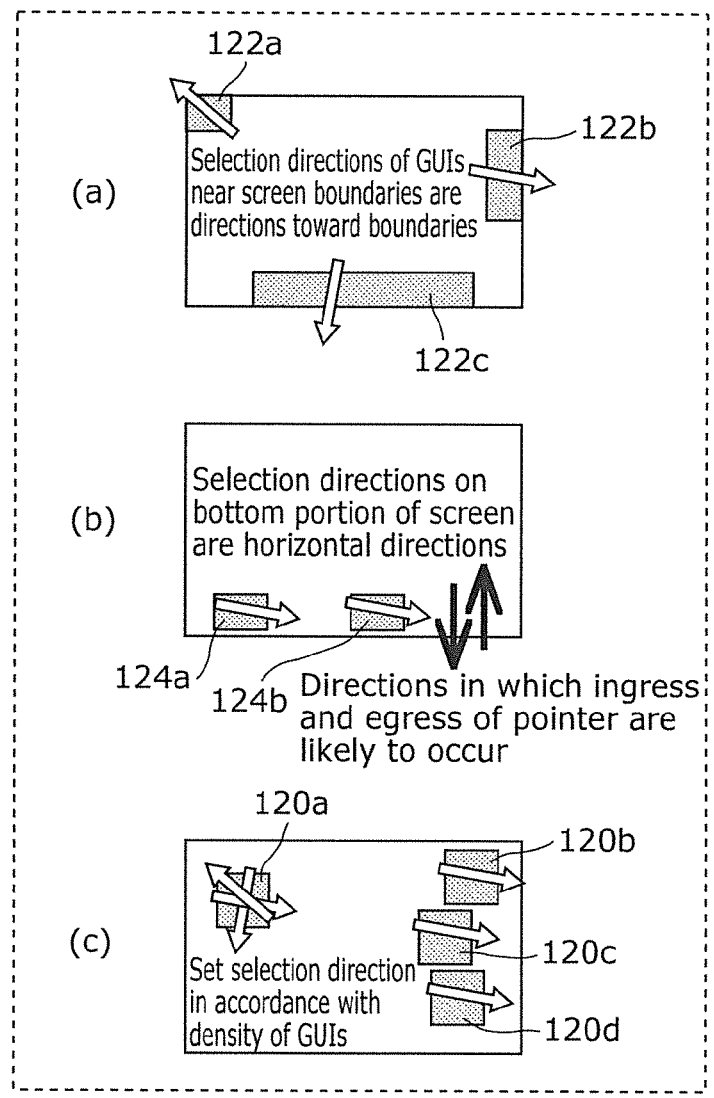
FIG. 23A shows diagrams illustrating an example user interaction corresponding to the operation (operation depending on locations and the density of first specific regions) illustrated in FIG. 20.

For example, as illustrated in the example user interaction in (a) of FIG. 23A, if first specific regions (icons 122*a*, 122*b*, and 122*c*) are disposed in contact with sides forming the frame of the display screen 52, the direction setting unit 66 sets directions across the sides as directions of the select operation of the icons 122*a* to 122*c*. This sets directions always out of the display screen 52 as effective directions. Thus, in the case where a plurality of icons are laid out along the frame (sides) of the display screen 52, even if the pointer inadvertently moves in a linear manner across all the icons, this is not recognized as the icon selection operation. Thus, operational error is prevented.

As a choice, as illustrated in the example user interaction in (b) of FIG. 23A, if first specific regions (icons 124*a*, 124*b* and 124*c*) are disposed in contact with a side forming the frame of the display screen 52, the direction setting unit 66 sets directions parallel with the side as the direction of the select operation of the icons 124*a* to 124*c*. This sets directions along the frame (the side) of the display screen 52 as effective directions. Thus, in the case where a plurality of icons is laid out along the frame of the display screen 52, moving the pointer across all the icons facilitates bulk selection of the icons. Moreover, the icon selection operation can be detected in distinction from movements of the pointer going out and in the display screen 52, thereby preventing operational error.

As another choice, as illustrated in the example user interaction in (c) of FIG. 23A, the direction setting unit 66 sets directions of the icon selection operation, in accordance with the density of first specific regions (icons 120*a*, 120*b*, 120*c*, and 120*d*). For example, if selectable icons are not close together like the icon 120*a*, the direction setting unit sets three directions as the directions of the select operation. On the other hand, when selectable icons are close together like the icons 120*b*, 120*c*, and 120*d*, the same one direction to these icons is set as the direction of the select operation. This limits the icon selection operation when the icons are close together, thereby avoiding operational error of inadvertently selecting a plurality of icons.

It should be noted that whether the icons are close together is determined by, for example, whether the number of icons is greater or smaller than a predetermined threshold of the density (for example, the number of icons per unit area).

Figure 23B:
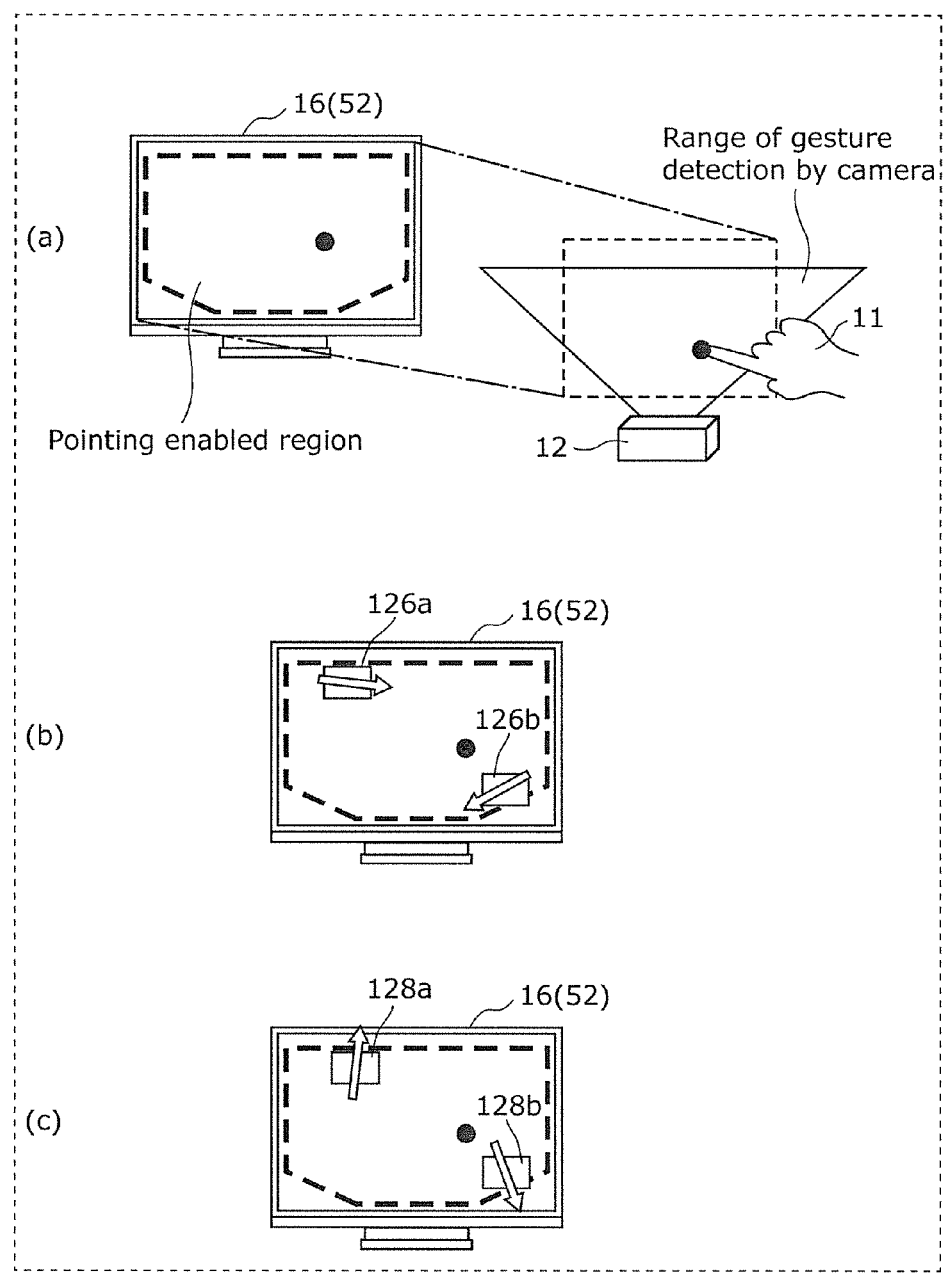
FIG. 23B shows diagrams illustrating another example user interaction corresponding to the operation (operation depending on the locations and the density of the first specific regions) illustrated in FIG. 20.

As still another choice, as illustrated in the example user interactions in (a) to (c) of FIG. 23B, the direction setting unit 66 sets directions of the icon selection operation with respect to the pointing enabled region (see (a) of FIG. 23B) set by the pointing enabled region setting unit 69 on the display screen 52. As (c) of FIG. 23B shows, if first specific regions (icons 128*a* and 128*b*) are disposed in contact with sides forming the frame of the pointing enabled region, the direction setting unit 66 sets directions across the sides as the directions of the icon selection operation. This sets directions always out of the pointing enabled region as effective directions. Thus, in the case where a plurality of icons is laid out along the frame (sides) of the pointing enabled region, even if the pointer inadvertently moves in a linear manner across all the icons, this is not recognized as the icon selection operation. Thus, operational error is prevented. Moreover, as (b) of FIG. 23B shows, if first specific regions (icons 126a and 126b) are disposed in contact with sides among the sides forming the frame of the pointing enabled region, the direction setting unit 66 may set directions in parallel with the sides as the directions of the icon selection operation. This sets directions in which the pointer is movable in the pointing enabled region as effective directions, thereby improving maneuverability of the icon selection operation.

Figure 24:
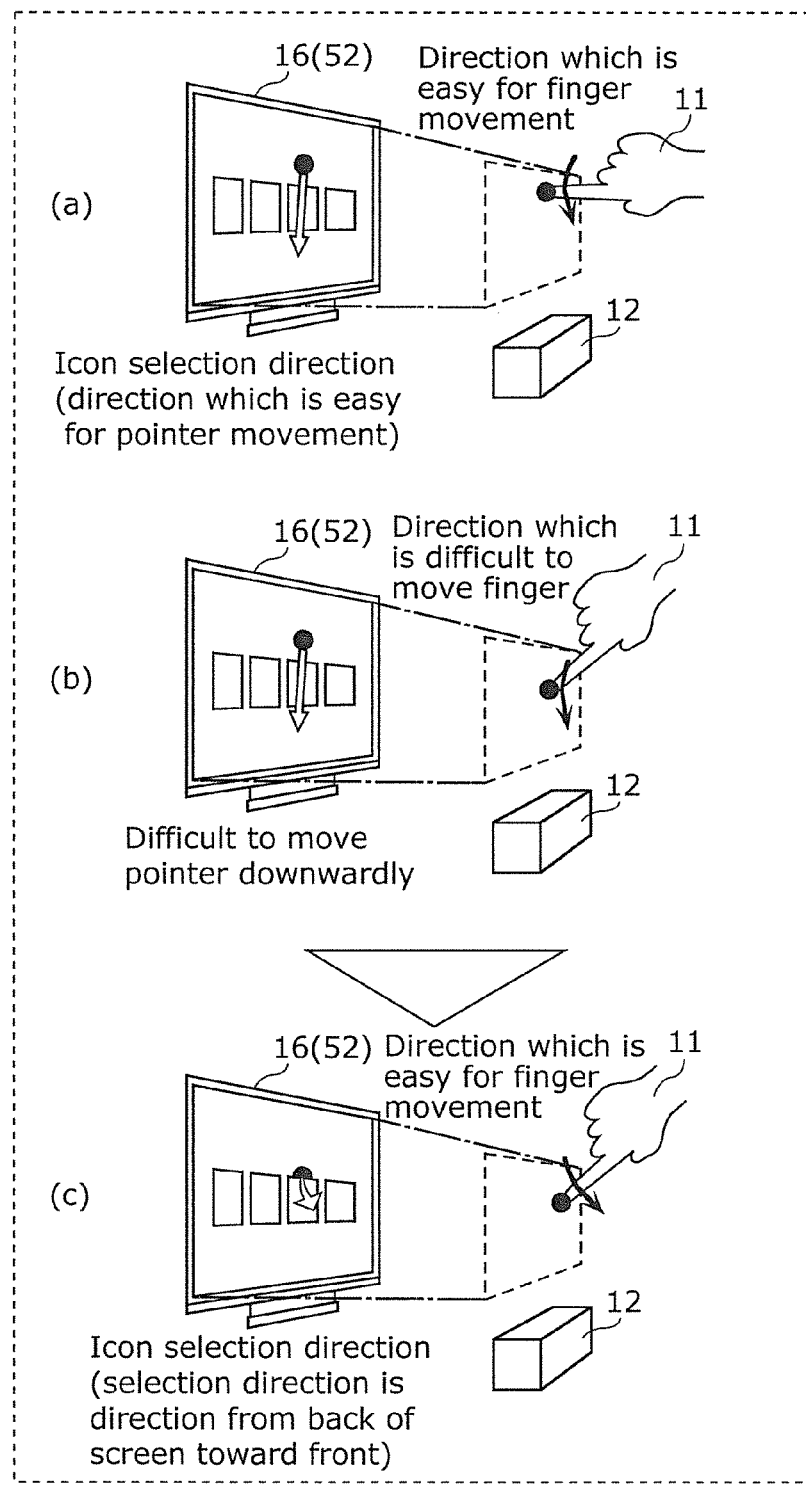
FIG. 24 shows diagrams illustrating an example user interaction corresponding to the operation (operation depending on a posture of a user's hand or finger) illustrated in FIG. 20.

As still another choice, as illustrated in the example user interaction in (a) to (c) of FIG. 24, the direction setting unit 66 sets a direction of the icon selection operation, in accordance with a posture of the indicator 11 detected by the indicator detection unit 42, such as a user's finger or hand. For example, if the indicator 11 is a finger, the direction setting unit 66 sets directions orthogonal to a direction the finger is pointing as effective directions. This sets directions which are easier for the icon selection operation as directions of the icon selection operation, taking an orientation of the user's hand or finger into account. This improves maneuverability and prevents operational error. Specifically, as (a) of FIG. 24 shows, if the user's finger, which is the indicator 11, is pointing a direction toward the display screen 52, an icon can be selected by moving the finger in the vertical direction (or, bending the finger or the wrist). Moreover, as (b) and (c) of FIG. 24 show, if the user's finger, which is the indicator 11, is pointing a direction parallel with the display screen 52 (for example, a direction pointing the ground) ((b) of FIG. 24), an icon can be selected by moving the finger in a direction parallel with a horizontal plane (for example, a direction from the back of the display screen 52 to the front) (or, bending the finger or the wrist) ((c) of FIG. 24).

Figure 25:
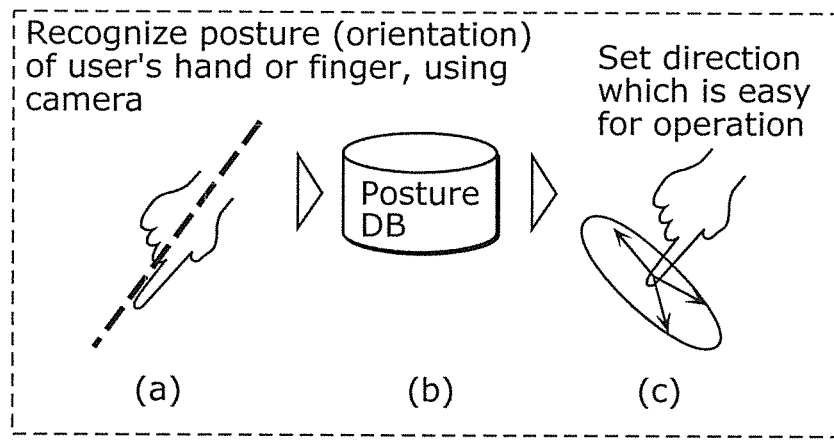
FIG. 25 shows diagrams illustrating detailed procedure for the operation (operation depending on a posture of the user's hand or finger) illustrated in FIG. 20.

It should be noted that when setting the direction of the icon selection operation, in accordance with a posture of the user's hand or finger, as illustrated in the procedure of FIG. 25, the indicator detection unit 42, first, recognizes the posture (orientation) of the user's hand or finger ((a) of FIG. 25), then, refers to a posture database in the direction setting unit 66 ((b) of FIG. 25), to set a direction which is easy for the icon selection operation, as the direction of the icon selection operation ((c) of FIG. 25). Here, the posture database includes information indicating correspondence between predetermined postures of the indicator and directions which are easy for the icon selection operation.

Figure 21:
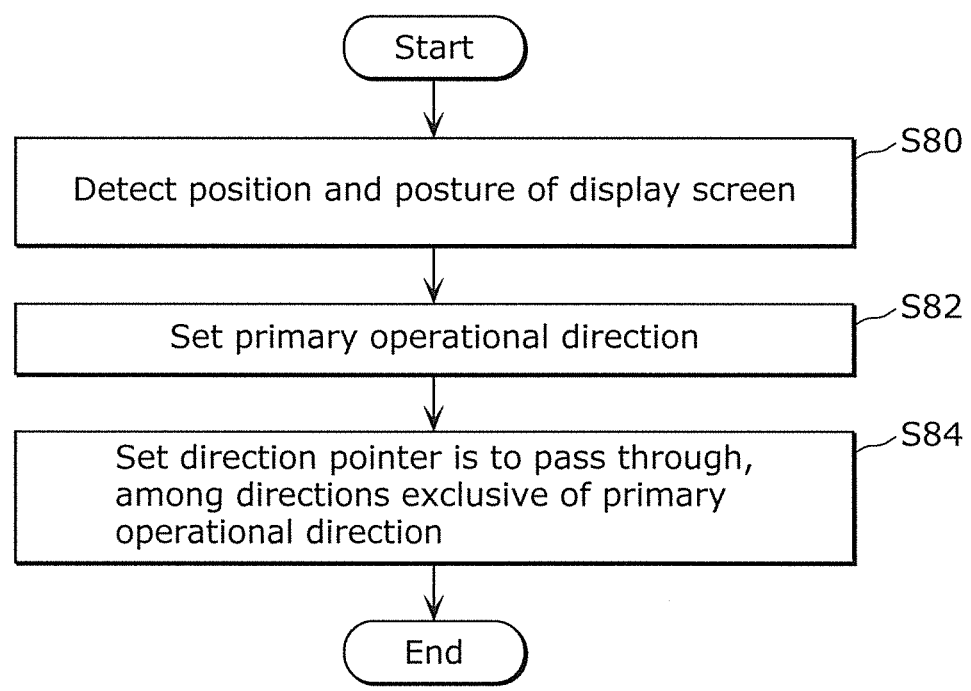
FIG. 21 is a flowchart illustrating an operation of the direction setting unit included in the information input device in the example 2, taking a primary operational direction into account.

FIG. 21 is a flowchart illustrating operation of the direction setting unit 66 included in the information input device 40b in this example, taking the primary operational direction into account.

First, the display screen state detection unit 80 detects a position and a posture of the display screen 52 relative to the indicator detection unit 42 (S80). For example, the display screen state detection unit 80 detects whether the display screen 52 is placed in a direction along the vertical direction (by way of example, whether the display screen 52 is in upright position on a desk), or placed in a direction parallel with the horizontal plane (by way of example, whether the display screen 52 lies on a desk, for example).

Next, the primary operational direction setting unit 68 sets a primary operational direction, in accordance with the position and posture of the display screen 52 detected by the display screen state detection unit 80 (S82). For example, the primary operational direction setting unit 68 sets motion of the indicator 11 in a plane parallel with the display screen 52 as the primary operational direction.

Then, among directions exclusive of the primary operational direction set by the primary operational direction setting unit 68, the direction setting unit 66 sets a direction in which the pointer is to pass through an icon which is the first specific region, that is, the direction of the icon selection operation (S84). For example, the direction setting unit 66 sets directions orthogonal to the primary operational direction as the directions of the icon selection operation.

Figure 26:
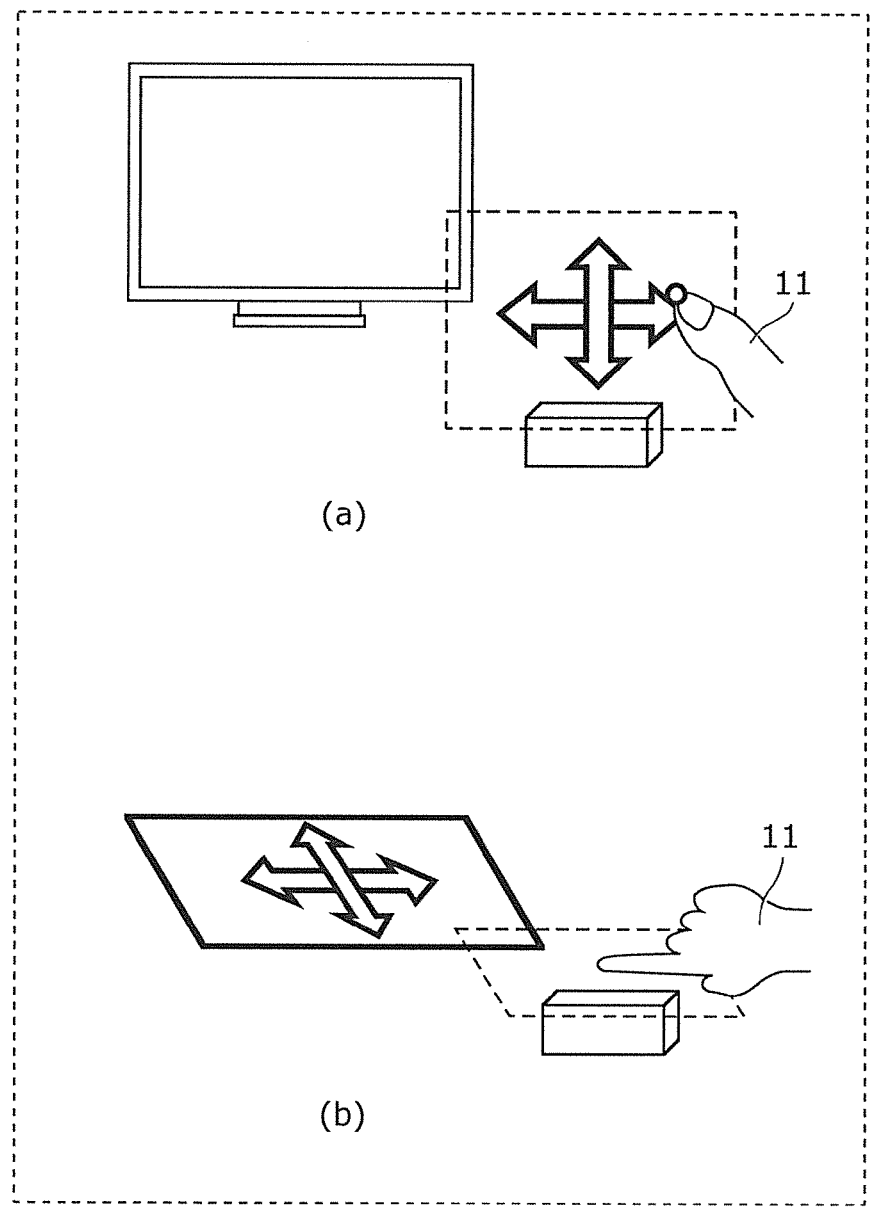
FIG. 26 shows diagrams illustrating an example user interaction corresponding to the operation (setting of the primary operational direction) shown in FIG. 21.
Figure 27:
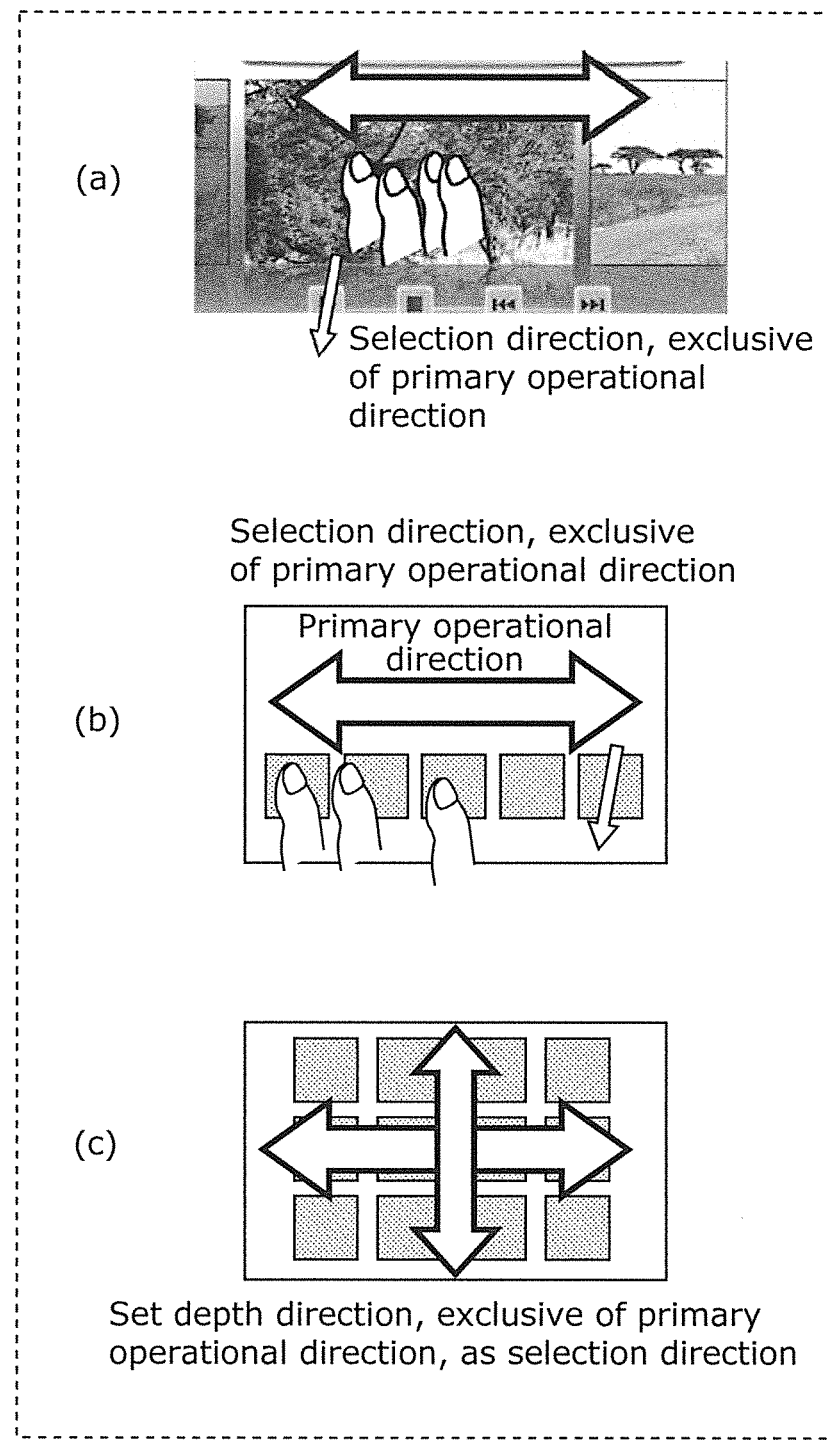
FIG. 27 shows diagrams illustrating an example user interaction corresponding to the operation (operation depending on the primary operational direction) shown in FIG. 21.

FIGS. 26 and 27 are diagrams showing example user interactions corresponding to the operation illustrated in FIG. 21.

As (a) of FIG. 26 shows, if the display screen state detection unit 80 detects that the display screen 52 is placed in the direction along the vertical direction (for example, the display screen 52 is in upright position on the desk), the primary operational direction setting unit 68 sets motion of the indicator 11 in a plane parallel with the display screen 52 (i.e., a plane along the vertical direction) as the primary operational direction.

On the other hand, as (b) of FIG. 26 shows, if the display screen state detection unit 80 detects that the display screen 52 is placed in the direction parallel with the horizontal plane (for example, the display screen 52 lies on a desk), the primary operational direction setting unit 68 sets motion of the indicator 11 in a plane parallel with the display screen 52 (i.e., a plane along the horizontal plane) as the primary operational direction.

Then, as FIG. 27 shows, the direction setting unit 66 sets a direction of the icon selection operation among directions exclusive of the primary operational direction set by the primary operational direction setting unit 68. For example, as (b) of FIG. 27 shows, if the primary operational directions are the horizontal directions relative to the display screen 52, the direction setting unit 66 sets directions of motion of the indicator 11 as moving the pointer in the vertical directions of the display screen 52, as the directions of the icon selection operation. On the other hand, as (c) of FIG. 27 shows, if the primary operational directions are vertical and horizontal directions of the display screen 52, the direction setting unit 66 sets a direction of motion of the indicator 11 as moving the pointer in the depth direction of the display screen 52, as the direction of the icon selection operation.

This reliably selects an icon in distinction from the primary operations such as scroll indication, thereby preventing operational error.

EXAMPLE 3

Next, an example 3 will be described as a third specific example of the above-described embodiment.

In the above-described embodiment, the information input device has been described which implements the pointing operation of moving the pointer and the select operation of selecting an icon as continuous and reliable operations. In the example 3, in addition to that functionality, an information display method will be described which allows the user to switch a screen display where an object (an item) is selected and a screen display where a process to be performed on the selected object is set, by the continuous operations in a three-dimensional space.

The example 3 is an example that focuses on a display function (i.e., an information display method) of the information input device 10 according to the above-described embodiment. In other words, this example is one of information display methods implemented in the information input device 10 which includes the hardware configuration illustrated in FIG. 2 and the functional configuration illustrated in FIG. 3.

Figure 28:
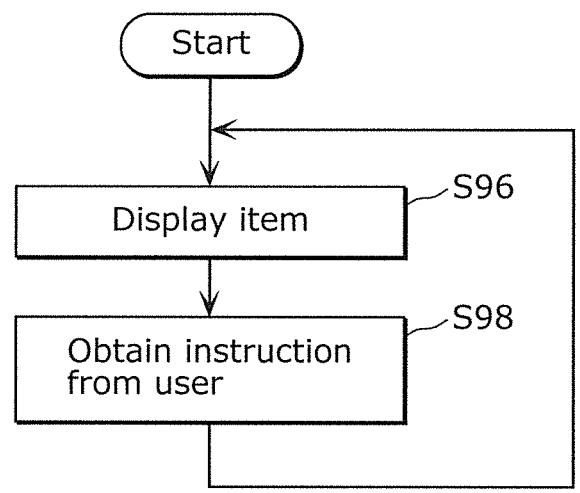
FIG. 28 is a flowchart illustrating an information display method according to an example 3 of the present invention.

FIG. 28 is a flowchart illustrating the information display method in this example.

In this example, the information input device 10 is a device which executes the information display method which is executed by a computer. The information input device 10, specifically, repeats a display step (S96) of displaying at least one item on the display screen 52, and an instruction obtaining step (S98) of obtaining an instruction from a user by detecting at least one of a position and an orientation (both the position and orientation, in the present embodiment) of the indicator in the three-dimensional space. It should be noted that items herein refer to, for example, icons indicative of applications, thumbnails indicative of content such as pictures and videos, and so on.

Figure 29:
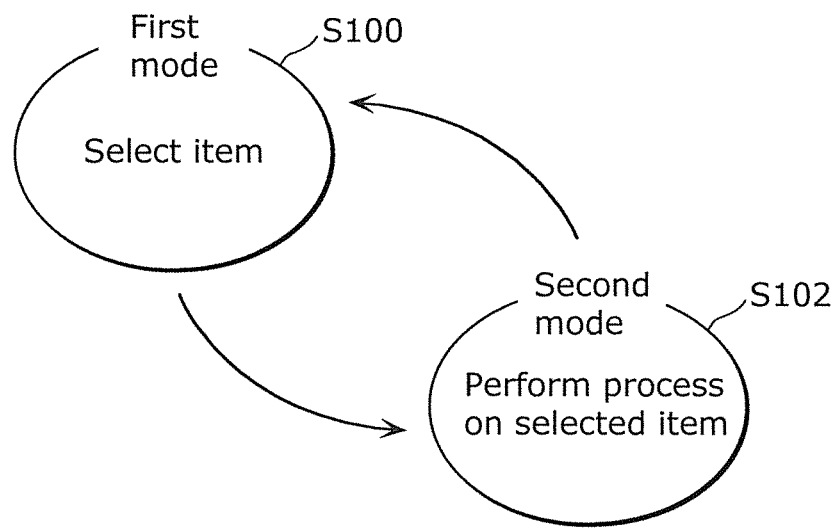
FIG. 29 is a diagram showing state transition in the display step illustrated in FIG. 28.

FIG. 29 is a diagram showing state transition in the display step (S96) illustrated in FIG. 28.

A first mode (S100) in which at least one item is selected from among one or more items in accordance with a user instruction obtained in the instruction obtaining step, and a second mode (S102) in which a process involving modification of display of the at least one item selected in the first mode is performed are provided in the display step (S96). In other words, in the display step (S96), the information input device 10 is in either the first mode (S100) or the second mode (S102).

Here, if the user instruction obtained in the instruction obtaining step (S98) is to cause movement from one of two or more regions set on the display screen 52 to one of the remaining regions, the information input device 10 switches from the first mode (S100) to the second mode (S102) or from the second mode (S102) to the first mode (S100).

It should be noted that the "two or more regions" may include two regions partitioned by a line segment displayed on the display screen 52, or may include two regions partitioned by an implicit line segment not displayed on the display screen 52. The "two or more regions" also include a region outside the display screen 52 (a virtually set region). For example, the "two or more regions" may include an area in the display screen 52 and areas outside the display screen 52. The "movement" includes a movement across such an explicit or implicit line segment (for example, the passage through the first specific region in the above-described embodiment).

It should be noted that in the display step (S96), the information input device 10 may display a plurality of groups on the display screen 52, provided that each group includes at least one item. In this case, the information input device 10 in the first mode (S100) sets a first group, among the plurality of groups, to be selectable, and sets a second group, among the plurality of groups, to be not selectable.

Here, in the first mode (S100), if the user instruction obtained in the instruction obtaining step (S98) is to cause movement, an item belonging to the first group turns to belong to the second group, and is made not selectable.

On the other hand, in the second mode (S102), an icon associated with a process which is performed on the item selected in the first mode (S100) is displayed on the display screen 52, and two or more regions are associated with the icon. If the user instruction obtained in the instruction obtaining step (S98) is to cause movement from one of the two or more regions associated with the icon to any of the remaining regions, a process associated with the icon is performed.

It should be noted that the icon can assume a state where the process associated with the icon can be performed and a state where the process cannot be performed, depending on an attribute of an item associated with the icon.

Figure 30:
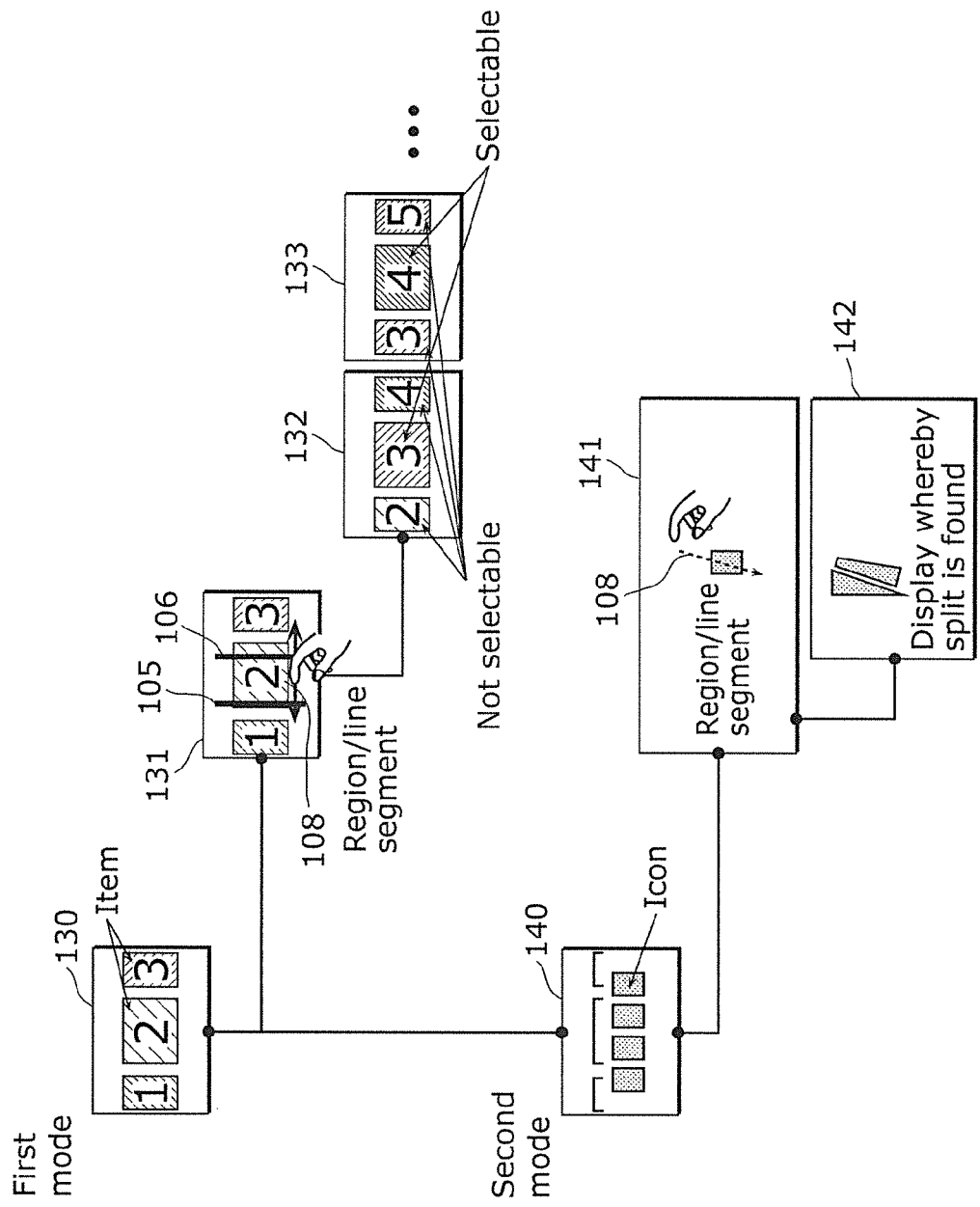
FIG. 30 is a diagram showing an example screen display of mode transition between two modes.

FIG. 30 is a diagram showing example screen displays for mode transition between the two modes in this example. Herein, four screen displays 130, 131, 132, and 133 are shown by way of example screen displays in the first mode, and three screen displays 140, 141, and 142 are shown by way of example screen displays in the second mode.

The screen display 130 is a representative example display in the first mode in which an item to be processed is selected in accordance with the user instruction, and three items are displayed. Herein, it should be noted that among items laid out in the horizontal direction, a centrally located item is the item to be selected. The screen display 131 is an example display of the screen display 130 in detail. The screen displays 132 and 133 are example displays after the screen display 131 is scrolled.

The screen display 140 is a representative example display in the second mode in which a process is performed on the item selected in the first mode, and four icons corresponding to four processes on the item (an item located at the center of side-by-side items) selected in the first mode are displayed. The screen display 141 is a figure showing an icon (an icon corresponding to one process) on the screen display 140 (a figure illustrating the select operation). The screen display 142 is an example display when an icon is selected and a process corresponding to the icon is performed on the item selected in the first mode.

Suppose that the screen display 130 in the first mode is currently displayed on the display screen 52. In this state, display on the display screen 52 changes from the screen display 130 in the first mode to the screen display 140 in the second mode as the user moves the pointer from one of the two regions set on the display screen 52 to the other (for example, from the area in the display screen 52 to the areas outside the display screen 52). In other words, four icons indicative of respective four processes on the item at the center of the side by side items on the screen display 130 are displayed.

In contrast, in a state where the screen display 140 in the second mode is currently displayed on the display screen 52, if the user moves the pointer from one of the two or more regions set on the display screen 52 to one of the remaining regions (for example, from the region outside the display screen 52 to the region inside the display screen 52) or if a predetermined time has elapsed while the pointer is outside the display screen 52, the display on the display screen 52 returns from the screen display 140 in the second mode to the screen display 130 in the first mode. In other words, the display on the display screen 52 returns to a screen display where the user can select an item from among a plurality of items.

Here, in the first mode in a state where the screen display 130 is displayed on the display screen 52, more particularly, as the screen display 131 shows, the two line segments 105 and 106 are displayed in the center of the display screen 52, being disposed in the vertical direction of the display screen 52 so as to be parallel with each other on the display screen 52. User operation on the screen display 131 is as described in the above-described embodiment as illustrated in, for example, FIG. 5A. For example, if the user performs an operation of moving the pointer 108 from a region between the two line segments 105 and 106 across the line segment 105 on the left of the region, as the screen displays 132 and 133 illustrate, the display is scrolled to the left for one item at each operation, displaying items. It should be noted that the transition from the first mode to the second mode means that an item at the center of side by side items on the display screen 52 is selected immediately prior to the transition.

Moreover, in the second mode, in a state where the screen display 140 is displayed on the display screen 52, the user can select an icon from among a plurality of icons by operating the indicator 11 such that the pointer 108 passes through the icon as the screen display 141 shows. This allows a process associated with the just selected icon to be performed on the item selected in the first mode. For example, if the item selected in the first mode is a thumbnail image of a video, and the icon selected in the second mode is an icon corresponding to "Play," the video corresponding to the thumbnail image is played on the display screen 52.

As such, according to the information display method in this example, the user can accomplish every process, switching, while seeing the display screen 52, the first mode in which item selection is allowed and the second mode in which a process on the selected item is performed. Consequently, the user can perform all operations simply by transitioning between the two display modes. Thus, as compared to a deeply layered menu, the operation is simple and the user can learn the method of operation in a short time.

Figure 31:
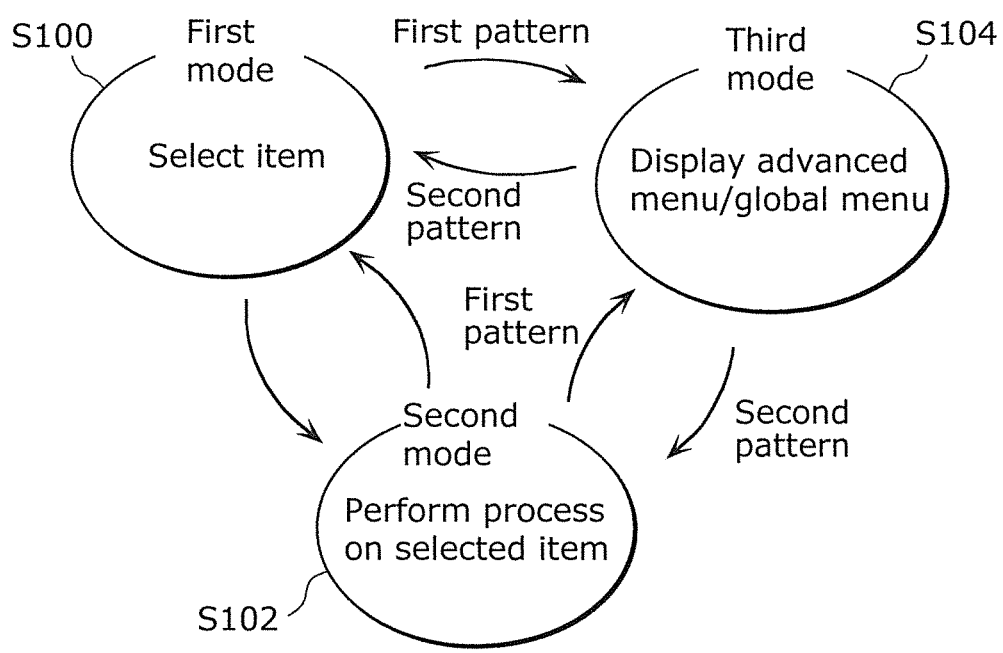
FIG. 31 is a diagram showing another example of the state transition in the display step illustrated in FIG. 28.

FIG. 31 is a diagram showing another example of the state transition in the display step (S96) illustrated in FIG. 28. Herein, the first mode (S100) and the second mode (S102), and, additionally, a third mode (S104) for displaying a menu are provided in the display step (S96). Here, examples of the third mode (S104) include at least one of a predetermined menu as advanced menu, a menu for instructions common to the first mode (S100) and the second mode (S102), a menu for turning off the power to the display screen 52, and a menu for launching predetermined programs including a browser.

For transition between the three modes, in the display step (S96), if the pointer movement indicated by the user instruction obtained in the instruction obtaining step (S98) belongs to the first pattern, the information input device 10 transitions from the first mode (S100) or the second mode (S102), which is the original mode, to the third mode (S104), whereas if the pointer movement indicated by the user instruction obtained in the instruction obtaining step (S98) belongs to the second pattern, the information input device 10 transitions from the third mode (S104) to the original mode.

Here, the first pattern and the second pattern are, for example, user instructions using a different number of the indicators 11. By way of example, pointing operation using one finger belongs to the first pattern, and gesture operation using five fingers belongs to the second pattern. It should be noted that the number of the indicators 11 in the three-dimensional space is detected in the instruction obtaining step (S98).

Figure 32:
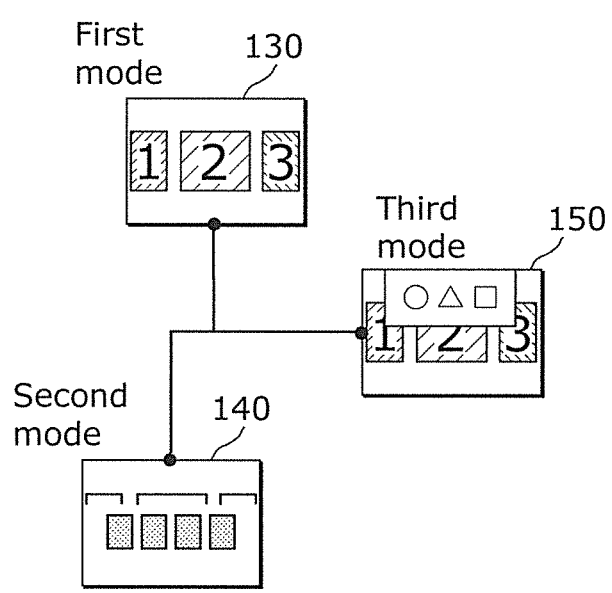
FIG. 32 is a diagram showing an example screen display of mode transition between three modes.

FIG. 32 is a diagram showing an example screen display of mode transition between three modes in this example. Herein, the screen display 130 is illustrated as an example screen display in the first mode, the screen display 140 is illustrated as an example screen display in the second mode, and a screen display 150 is illustrated as an example screen display in the third mode.

The screen display 150 is a representative example display displaying a menu in the third mode. Examples of the menu include an advanced menu and a global menu where instructions of operations (power off, launch of utility software programs including a browser) which are common throughout the menu can be provided.

The user can transition from one of the first mode (S100) and the second mode (S102), which is an original mode, to the third mode (S104) if the user performs an operation of pointer movement belonging to the first pattern, for example, quickly moving a finger to the left or right whereas the user can transition from the third mode (S104) to the first mode (S100) or the second mode (S102), which is the original mode, if the user performs an operation of pointer movement belonging to the second pattern, for example, quickly moving five fingers to the top or to the bottom.

As such, according to the information display method in this example, the user can accomplish every process, switching, while seeing the display screen 52, the first mode in which item selection is allowed, the second mode in which a process on the selected item is performed, and the third mode in which operations common to the first mode and the second mode are allowed. Consequently, the user can perform all operations simply by transitioning between the three display modes. Thus, as compared to a deeply layered menu, the operation is simple and the user can learn the method of operation in a short time. Moreover, in the three modes, transition is possible from any of the three modes to any of the remaining modes, thereby allowing the user to accomplish a desired process, without being tied up by burdensome rules for switching screens.

While the information display method in this example is implemented by the information input device 10 illustrated in FIGS. 2 and 3, it should be noted that the information display method may be implemented by an information display device that is specific to this example. The information display device is a device which includes a computer including the control unit 20 and so on in FIG. 2 and the display screen 16 in FIG. 2. The computer executes (a) displaying one or more items on a display screen; and (b) obtaining an instruction from a user by detecting at least one of a position and an orientation of an indicator in a three-dimensional space. In step (a), the computer has a first mode in which at least one item is selected from among the one or more items in accordance with the instruction from the user obtained in step (b); and a second mode in which a process involving modification of display of the at least one item selected in the first mode is performed, wherein if the instruction from the user obtained in step (b) is to cause movement from one of two or more regions set on the display screen 16 to any of remaining regions, the first mode is switched to the second mode or the second mode is switched to the first mode.

According to this, the information display method in this example can be implemented in a versatile computer.

While the information input device and the information display method according to one or more aspects of the present invention have been described with reference to the embodiment and the examples 1 to 3, the present invention is not limited to the embodiment and the examples 1 to 3. Various modifications to the embodiment and the examples 1 to 3 that may be conceived by those skilled in the art and combinations of components of different embodiment and examples 1 to 3 are intended to be included within the scope of the one or more aspects of the present invention, without departing from the spirit of the present invention.

For example, in the embodiment and the examples 1 to 3, each of the components may take the form as dedicated hardware or may be implemented by executing a software program suitable for each component. Each component may be implemented by a program execution unit, such as CPU or processor, loading and executing the software program stored in a recording medium such as a hard disk or a semiconductor memory.

Here, the software program for implementing the information input device in the examples 1 and 2 is as follows.

Specifically, the program causes a computer to execute steps of the following information input method. The information input method is an information input method executed by a device for obtaining, from a user, an instruction for an image displayed on a display screen, the information input method including: (a) detecting at least one of a position and an orientation of an indicator in a three-dimensional space; (b) setting a position on the display screen of a pointer to be displayed on the display screen, in correspondence with the at least one of the position and the orientation of the indicator detected in step (a); (c) obtaining and storing time-sequenced positional information which indicates the position set in step (b); (d) detecting that the pointer has passed through a first specific region which is a predetermined region on the display screen, using the time-sequenced positional information stored in step (c); (e) obtaining a direction in which the pointer has passed through the first specific region, if it is detected in step (d) that the pointer has passed through the first specific region; and (f) modifying an image displayed on the display screen, depending on the direction obtained in step (e).

Moreover, the software program for implementing the information display method in the example 3 is as follows.

Specifically, the program causes a computer to execute steps of the following information display method. The information display method includes: (a) displaying one or more items on a display screen; and (b) obtaining an instruction from a user by detecting at least one of a position and an orientation of an indicator in a three-dimensional space, step (a) having: a first mode in which at least one item is selected from among the one or more items in accordance with the instruction from the user obtained in step (b); and a second mode in which a process involving modification of display of the at least one item selected in the first mode is performed, wherein if the instruction from the user obtained in step (b) is to cause movement from one of two or more regions set on the display screen to any of remaining regions, the first mode is switched to the second mode or the second mode is switched to the first mode.

Moreover, some or all the components included in each of the devices described above may be configured with one system LSI (Large Scale Integration). The system LSI is a super multi-function LSI manufactured by integrating a plurality of components on one chip, and is, specifically, a computer system which includes a microprocessor, a ROM, a RAM, and so on. The ROM stores a computer program. The system LSI achieves its function by the microprocessor loading the computer program from the ROM into the RAM and performing operations such as computing in accordance with the loaded computer program.

Moreover, some or all the components included in each of the devices described above may be configured with an IC card or a single module which is detachable to the device. The IC card or the module is a computer system which includes a microprocessor, a ROM, a RAM, and so on. The IC card or the module may include the above-mentioned super multi-function LSI. The IC card or the module performs its functionality by the microprocessor operating in accordance with the computer program. The IC card or the module may be of tamper-resistant.

Moreover, the present invention may be implemented in a computer-readable recording medium having stored therein a computer program or digital signals, for example, a flexible disk, a hard disk, CD-ROM, MO, DVD, DVD-ROM, DVD-RAM, BD (Blu-ray (registered trademark) Disc), or a semiconductor memory. Furthermore, the present invention may be implemented in the digital signal stored in these recording media.

Moreover, the computer program or the digital signals according to the present invention may be transmitted via an electric communication line, a wireless or wired communication line, a network represented by the Internet, data broadcast, and so on.

Moreover, by transferring the program or the digital signals stored in the recording medium, or transferring the program or the digital signals via the network or the like, the present invention may be implemented in other independent computer system.

Moreover, in the embodiment and examples described above, processes (functions) may be implemented by being centrally processed by a single device (system) or may be implemented by being executed in a distributed way among a plurality of devices.

INDUSTRIAL APPLICABILITY

The present invention can be utilized as an information input device and an information display method which provide GUIs, for example, as software and hardware which implement the information input device or the information display method included in an apparatus having a display screen, such as TV, a computer display, and a tablet.

REFERENCE SIGNS LIST

10, 40a, 40b Information input device
11 Indicator
12 Stereo camera
14 Communication unit
16 Display screen
18 Input unit
20 Control unit
22 CPU
24 ROM
26 RAM
28 Nonvolatile memory
42 Indicator detection unit
44 Pointer position setting unit
46 Storage unit
48 First passage detection unit
50 Direction obtainment unit
52 Display screen
60a, 60b, 60c Display control unit
62 First image modifying unit
64 Second image modifying unit
65 Third image modifying unit
66 Direction setting unit
68 Primary operational direction setting unit
69 Pointing enabled region setting unit
70 Repetition processing unit
72 Repetition detection enabling unit
74 Repetition detecting unit
76 Second passage detection unit
80 Display screen state detection unit

The invention claimed is:

1. An information input device for obtaining, from a user, an instruction for an image displayed on a display screen, the information input device comprising:

an indicator detection unit configured to detect at least one of a position and an orientation of an indicator in a three-dimensional space, without the indicator contacting the display screen;
a pointer position setting unit configured to set a position on the display screen of a pointer to be displayed on the display screen, in correspondence with the at least one of the position and the orientation of the indicator in the three-dimensional space detected by the indicator detection unit;
a storage unit configured to obtain and store time-sequenced positional information which indicates the position set by the pointer position setting unit;
a first passage detection unit configured to detect that the pointer has passed through a first specific region displayed on the display screen, using the time-sequenced positional information stored in the storage unit, the first specific region being associated with a specific operation and different from an object of the specific operation;
a direction obtainment unit configured to obtain a direction in which the pointer has passed through the first specific region, if the first passage detection unit detects that the pointer has passed through the first specific region; and
a first image modifying unit configured to modify the image, which is the object of the specific operation and displayed on the display screen, depending on the direction obtained by the direction obtainment unit and the specific operation associated with the first specific region through which the pointer is detected to have passed.

2. The information input device according to claim 1, wherein the first specific region is configured with one or more line segments displayed on the display screen,
the first passage detection unit is configured to detect that the pointer has passed through one of the one or more line segments crosswise, and
the first image modifying unit is configured to scroll the image along the direction obtained by the direction obtainment unit.

3. The information input device according to claim 1, wherein the first specific region is configured with two line segments displayed on the display screen, disposed in parallel with each other,
the first passage detection unit is configured to detect that the pointer has passed through one of the two line segments crosswise, and
the direction obtainment unit is configured to obtain the direction by determining which one of the two line segments through which the pointer has moved crosswise from a first region between the two line segments.

4. The information input device according to claim 1, wherein the first specific region is an icon displayed on the display screen, and
if the direction obtained by the direction obtainment unit is a predetermined direction, the first image modifying unit is configured to modify the image in such a manner that the icon is split into two or more partial icons.

5. The information input device according to claim 1, further comprising:
a repetition detecting unit configured to detect that the pointer is in a repetitive motion on the display screen, using the time-sequenced positional information stored in the storage unit;
a repetition detection enabling unit configured to disable the repetition detecting unit for detection, and enable the repetition detecting unit for detection after the first passage detection unit detects that the pointer has passed through the first specific region; and
a second image modifying unit configured to repeatedly modify the image if an effective detection is performed by the repetition detecting unit.

6. The information input device according to claim 5, wherein the repetitive motion includes at least one of the pointer in a circular motion on the display screen and the pointer moving back and forth on the display screen.

7. The information input device according to claim 5, wherein the repetition detecting unit is further configured to detect an end of the repetitive motion, and
the repetition detection enabling unit is further configured to disable the repetition detecting unit for detection if the repetition detecting unit detects the end of the repetitive motion.

8. The information input device according to claim 5, further comprising
a second passage detection unit configured to detect that the pointer has passed through a second specific region which is predetermined on the display screen, using the time-sequenced positional information stored in the storage unit,
wherein the repetition detection enabling unit is further configured to disable the repetition detecting unit for detection if the second passage detection unit detects that the pointer has passed through the second specific region.

9. The information input device according to claim 8, wherein the second passage detection unit is further configured to obtain a direction in which the pointer has passed through the second specific region, and
the repetition detection enabling unit is configured to disable the repetition detecting unit for detection if the second passage detection unit detects that the pointer has passed through the second specific region and the direction obtained by the second passage detection unit is a predetermined direction.

10. The information input device according to claim 9, further comprising
a third image modifying unit configured to modify the second specific region, depending on a degree to which the second image modifying unit modifies the image.

11. The information input device according to claim 10, wherein modification of the image, which corresponds to the repetitive motion, is scrolling the image and moving the pointer on the display screen, and
the third image modifying unit is configured to display an image indicative of a location of the second specific region by placing the second specific region farther away from the first specific region with increased rates at which the image is scrolled and the pointer is moved.

12. The information input device according to claim 1, further comprising
a direction setting unit configured to set a direction in which the pointer is to pass through the first specific region, in accordance with an attribute of the first specific region,
wherein the first image modifying unit is configured to modify the image if the direction obtained by the direction obtainment unit is the direction set by the direction setting unit.

13. The information input device according to claim 12, wherein if the first specific region is disposed in contact with a side among sides forming a frame of the display screen, the direction setting unit is configured to set a direction across the side as the direction in which the pointer is to pass through the first specific region.

14. The information input device according to claim 12, wherein if the first specific region is disposed in contact with a side among sides forming a frame of the display screen, the direction setting unit is configured to set a direction parallel with the side as the direction in which the pointer is to pass through the first specific region.

15. The information input device according to claim 12, wherein the direction setting unit is configured to set the direction in which the pointer is to pass through the first specific region, in accordance with a density of a plurality of the first specific regions.

16. The information input device according to claim 12, further comprising
a primary operational direction setting unit configured to set a primary operational direction of the user with respect to the image, based on an attribute of the first specific region,
wherein the direction setting unit is configured to set a direction, among directions exclusive of the primary operational direction set by the primary operational direction setting unit, as the direction in which the pointer is to pass through the first specific region.

17. The information input device according to claim 16, further comprising
a display screen state detection unit configured to detect a position and a posture of the display screen relative to the indicator detection unit,
wherein the primary operational direction setting unit is configured to set the primary operational direction, in accordance with the position and the posture detected by the display screen state detection unit.

18. The information input device according to claim 12, wherein the indicator detection unit is configured to detect a posture of a hand or a finger of the user, and
the direction setting unit is configured to set the direction in which the pointer is to pass through the first specific region, in accordance with the posture detected by the indicator detection unit.

19. An information input method executed by a device for obtaining, from a user, an instruction for an image displayed on a display screen, the information input method comprising:
(a) detecting at least one of a position and an orientation of an indicator in a three-dimensional space, without the indicator contacting the display screen;
(b) setting a position on the display screen of a pointer to be displayed on the display screen, in correspondence with the at least one of the position and the orientation detected in step (a);
(c) obtaining and storing time-sequenced positional information which indicates the position set in step (b);
(d) detecting that the pointer has passed through a first specific region displayed on the display screen, using the time-sequenced positional information stored in step (c), the first specific region being associated with a specific operation and different from an object of the specific operation;
(e) obtaining a direction in which the pointer has passed through the first specific region, if the pointer is detected in step (d) as having passed through the first specific region; and
(f) modifying an image, which is the object of the specific operation and displayed on the display screen, depending on the direction obtained in step (e) and the specific operation associated with the first specific region through which the pointer is detected, in step (d), as having passed.

20. A non-transitory computer-readable recording medium storing a program for causing a computer to execute the information input method according to claim 19.

21. An information display method executed by a computer, the information display method comprising:
(a) displaying one or more items on a display screen;
(b) obtaining an instruction from a user by detecting at least one of a position and an orientation of an indicator in a three-dimensional space, without the indicator contacting the display screen;
(c) detecting that a pointer displayed on the display screen has passed through a first specific region displayed on the display screen, the first specific region being associated with a specific operation and different from an object of the specific operation; and
(d) obtaining a direction in which the pointer has passed through the first specific region, if the pointer has been detected, in step (c), as having passed through the first specific region,
step (a) having:
a first mode in which at least one item is selected from among the one or more items in accordance with the instruction from the user obtained in step (b); and
a second mode in which a process involving modification of display of the at least one item selected in the first mode is performed,
wherein the process on the at least one item selected in the first mode includes modifying an image, which is the object of the specific operation and displayed on the display screen, depending on the direction obtained in step (d) and the specific operation associated with the first specific region through which the pointer is detected, in step (c), as having passed, and if the instruction from the user obtained in step (b) is to cause movement from one of two or more regions set on the display screen to any of remaining regions, the first mode is switched to the second mode or the second mode is switched to the first mode.

22. The information display method according to claim 21,
wherein the first specific region is configured with a line segment displayed on the display screen,
the two or more regions include two regions partitioned by the line segment displayed on the display screen, and
the movement includes a movement across the line segment.

23. The information display method according to claim 21,
wherein a plurality of groups are displayed on the display screen in step (a), the groups each including at least one item, and
in the first mode, a first group of the plurality of groups is selectable and a second group of the plurality of groups is not selectable.

24. The information display method according to claim 23,
wherein in the first mode, if the instruction from the user obtained in step (b) is to cause the movement, an item belonging to the first group turns to belong to the second group, and is made not selectable.

25. The information display method according to claim 21,
wherein in the second mode, an icon associated with the process on the at least one item selected in the first mode is displayed on the display screen, the icon is associated with two or more regions, and the process associated with the icon is performed if the instruction from the user obtained in step (b) is to cause movement from one of the two or more regions associated with the icon to any of remaining regions.

26. The information display method according to claim 25, wherein the icon assumes a state where the process associated with the icon can be performed and a state where the process associated with the icon cannot be performed, depending on an attribute of the at least one item with which the icon is associated.

27. The information display method according to claim 21, wherein step (a) further has a third mode in which a menu is displayed, in step (a), if pointer movement indicated by the instruction from the user obtained in step (b) belongs to a first pattern, the first mode or the second mode, which is an original mode, is switched to the third mode, and if the pointer movement indicated by the instruction from the user obtained in step (b) belongs to a second pattern, the third mode is switched to the original mode.

28. The information display method according to claim 27, wherein the number of the indicators in a three-dimensional space is further detected in step (b), and the first pattern and the second pattern are user instructions using a different number of the indicators.

29. A non-transitory computer-readable recording medium storing a program for causing a computer to execute the information display method according to claim 21.

30. An information display device comprising a computer and a display screen, the computer executing:

(a) displaying one or more items on the display screen;

(b) obtaining an instruction from a user by detecting at least one of a position and an orientation of an indicator in a three-dimensional space, without the indicator contacting the display screen;

(c) detecting that a pointer displayed on the display screen has passed through a first specific region displayed on the display screen, the first specific region being associated with a specific operation and different from an object of the specific operation; and (d) obtaining a direction in which the pointer has passed through the first specific region, if the pointer has been detected, in step (c), as having passed through the first specific region, step (a) having:

a first mode in which at least one item is selected from among the one or more items in accordance with the instruction from the user obtained in step (b); and a second mode in which a process involving modification of display of the at least one item selected in the first mode is performed, wherein the process on the at least one item selected in the first mode includes modifying an image, which is the object of the specific operation and displayed on the display screen, depending on the direction obtained in step (d) and the specific operation associated with the first specific region through which the pointer is detected, in step (c), as having passed, and if the instruction from the user obtained in step (b) is to cause movement from one of two or more regions set on the display screen to any of remaining regions, the first mode is switched to the second mode or the second mode is switched to the first mode.

* * * * *